United States Patent
Nigo et al.

(10) Patent No.: US 11,502,634 B2
(45) Date of Patent: Nov. 15, 2022

(54) DRIVING DEVICE, COMPRESSOR, AIR CONDITIONER, AND DRIVING METHOD

(71) Applicant: Mitsubishi Electric Corporation, Tokyo (JP)

(72) Inventors: Masahiro Nigo, Tokyo (JP); Yuji Hirosawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 413 days.

(21) Appl. No.: 16/615,304

(22) PCT Filed: Jul. 25, 2017

(86) PCT No.: PCT/JP2017/026877
§ 371 (c)(1),
(2) Date: Nov. 20, 2019

(87) PCT Pub. No.: WO2019/021373
PCT Pub. Date: Jan. 31, 2019

(65) Prior Publication Data
US 2020/0144951 A1    May 7, 2020

(51) Int. Cl.
*H02P 25/18* (2006.01)
*F25B 49/02* (2006.01)
(Continued)

(52) U.S. Cl.
CPC ............ *H02P 25/18* (2013.01); *F25B 49/025* (2013.01); *H02K 1/146* (2013.01); *H02K 1/276* (2013.01); *H02P 27/08* (2013.01)

(58) Field of Classification Search
CPC ........ H02P 25/18; H02P 27/08; F25B 49/025; H02K 1/276
(Continued)

(56) References Cited

U.S. PATENT DOCUMENTS

2014/0217944 A1* 8/2014 Yang .................... H02P 6/18
318/400.34
2016/0333856 A1* 11/2016 Zabalza ................ F03D 9/255
(Continued)

FOREIGN PATENT DOCUMENTS

JP           3237332 B2    12/2001
JP       2005051950 A      2/2005
(Continued)

OTHER PUBLICATIONS

Machine translation of JP 4722069 (Year: 2011).*
(Continued)

*Primary Examiner* — Kawing Chan
(74) *Attorney, Agent, or Firm* — Posz Law Group, PLC

(57) ABSTRACT

A driving device includes an inverter to output a voltage to coils, a connection switching unit to switch a connection state of the coils between a Y connection and a delta connection, and a controller. The controller causes the inverter to stop outputting, when the connection state of the coils is the Y connection and a current value of the inverter reaches a first threshold A, or when the connection state of the coils is the delta connection and the current value of the inverter reaches a second threshold B. The first threshold A and the second threshold B satisfy $B<\sqrt{3}\times A$.

14 Claims, 17 Drawing Sheets

(51) Int. Cl.
*H02K 1/14* (2006.01)
*H02K 1/276* (2022.01)
*H02P 27/08* (2006.01)

(58) Field of Classification Search
USPC .......................................... 318/771; 62/228.4
See application file for complete search history.

(56) References Cited

U.S. PATENT DOCUMENTS

| 2019/0245470 | A1 | 8/2019 | Nigo |
| 2019/0245471 | A1 | 8/2019 | Nigo |
| 2020/0021222 | A1 | 1/2020 | Nigo |

FOREIGN PATENT DOCUMENTS

| JP | 2008-228513 | A | | 9/2008 |
| JP | 4619826 | B2 | | 1/2011 |
| JP | 4722069 | B2 | * | 7/2011 |
| JP | 4722069 | B2 | | 7/2011 |
| JP | 2012-070531 | A | | 4/2012 |
| JP | 2012-90448 | A | | 5/2012 |
| JP | 2014-124062 | A | | 7/2014 |
| WO | 2016/051456 | A1 | | 4/2016 |
| WO | 2018/078835 | A1 | | 5/2018 |
| WO | 2018/078840 | A1 | | 5/2018 |
| WO | 2018/078845 | A1 | | 5/2018 |

OTHER PUBLICATIONS

Machine translation of WO2016051456A1 (Year: 2016).*
Office Action dated Nov. 1, 2021 in connection with counterpart Korean Patent Application No. 10-2019-7037294, a machine English translation of the Office Action, and one reference cited therein.
Office Action dated Jan. 21, 2022 in connection with counterpart European Patent Application No. 17919562.3.
Office Action dated Jul. 24, 2020 in connection with counterpart Australian Application No. 2017424860.
Extended European Search Report dated Jun. 30, 2020 in connection with counterpart European Patent Application No. 17919562.3.
Indian Office Action dated Jan. 20, 2021, issued in corresponding IN Patent Application No. 202047000210.
Office Action dated May 25, 2022 in connection with counterpart Korean Patent Application No. 10-2019-7037294 (and English machine translation).
Office Action dated Aug. 30, 2022 in connection with counterpart Chinese Patent Application No. 201780093101.X (and English machine translation).
Hearing Notice dated Aug. 30, 2022 in connection with counterpart Indian Patent Application No. 202047000210.

* cited by examiner

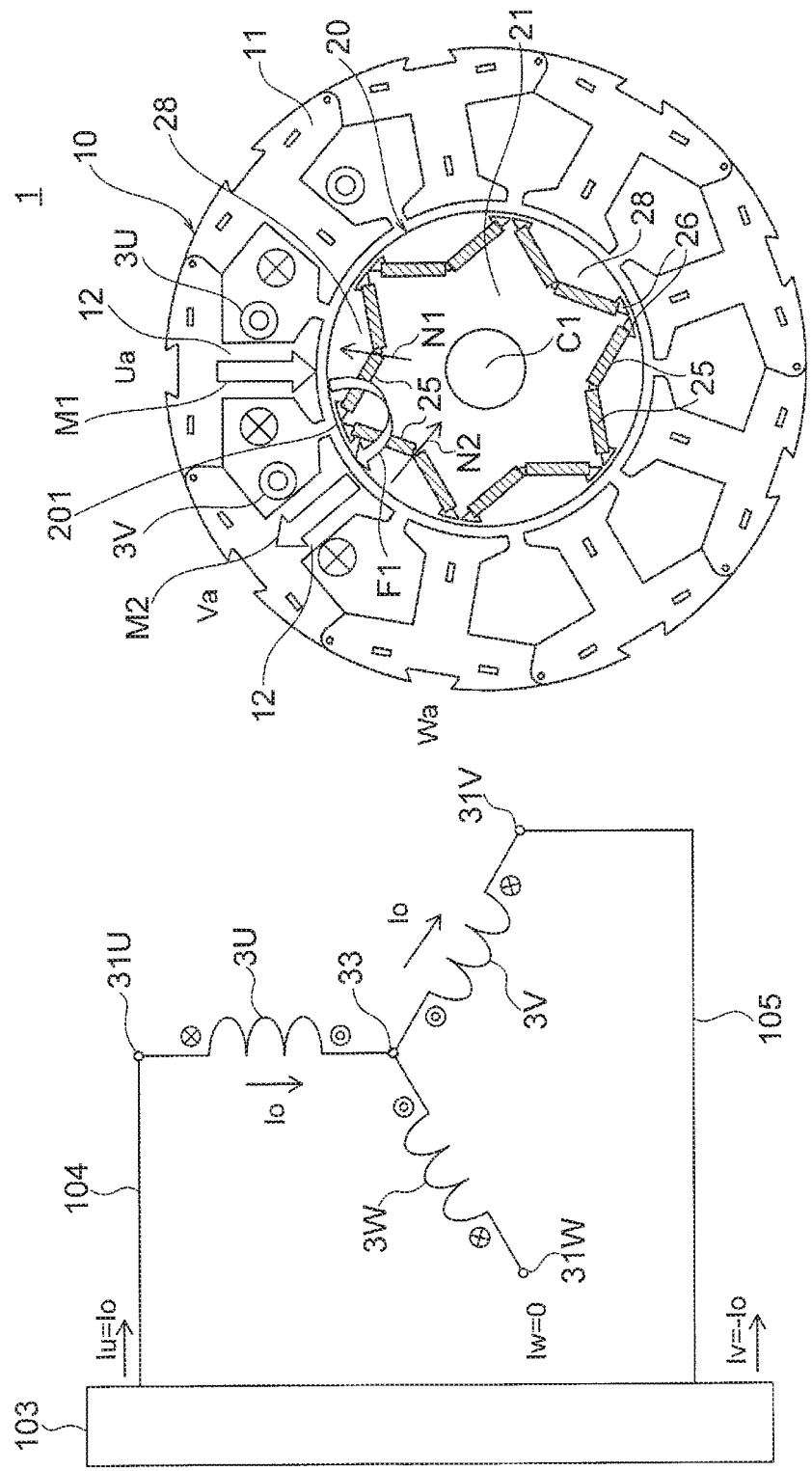

DRIVING DEVICE, COMPRESSOR, AIR CONDITIONER, AND DRIVING METHOD

CROSS REFERENCE TO RELATED APPLICATION

This application is a U.S. national stage application of International Patent Application No. PCT/JP2017/026877 filed on Jul. 25, 2017, the disclosure of which is incorporated herein by reference.

TECHNICAL FIELD

The present invention relates to a driving device for driving a motor, a compressor driven by the motor, an air conditioner including the motor, and a driving method for driving the motor.

BACKGROUND

In an air conditioner, a connection state of coils of a motor for driving a compressor is switched between a Y connection (also referred to as a star connection) and a delta connection (also referred to as a Δconnection) in order to increase an operation efficiency during low-speed rotation and during high-speed rotation of the motor.

In order to suppress demagnetization of a permanent magnet of a motor, the motor is stopped when an output current of an inverter reaches a threshold (overcurrent protection level). Further, the overcurrent protection level is switched depending on a connection state, since a current flowing in coils in a delta connection is $\sqrt{3}$ times as large as that in a Y connection (see, for example, Patent Reference 1).

PATENT REFERENCE

Patent Reference 1: Japanese Patent No. 4722069 (see paragraphs 0031 to 0033 and 0042)

However, during operation of a motor, a special operation state may occur such as a state where a current flows only in two of three-phase coils. In such a special operation state, it is required to reduce demagnetization of a permanent magnet (i.e., make the permanent magnet be unlikely to be demagnetized).

SUMMARY

The present invention is made to solve the problem described above, and an object of the present invention is to reduce demagnetization of a permanent magnet even in a special operation state.

A driving device according to the present invention is a driving device to drive a motor having coils. The driving device includes an inverter to output a voltage to the coils, a connection switching unit to switch a connection state of the coils between a Y connection and a delta connection, and a controller to cause the inverter to stop outputting when the connection state of the coils is the Y connection and a current value of the inverter reaches a first threshold A, or when the connection state of the coils is the delta connection and the current value reaches a second threshold B. The first threshold A and the second threshold B satisfy $B<\sqrt{3}\times A$.

A driving method according to the present invention is a driving method to drive a motor by means of an inverter. The motor has coils whose connection state is switchable between a Y connection and a delta connection. The driving method includes the steps of detecting a current value of the inverter, and causing the inverter to stop outputting when the connection state of the coils is the Y connection and the current value reaches a first threshold A, or when the connection state of the coils is the delta connection and the current value reaches a second threshold B. The first threshold A and the second threshold B satisfy $B<\sqrt{3}\times A$.

According to the present invention, the first threshold A for the Y connection and the second threshold B for the delta connection satisfy $B<\sqrt{3}\times A$. Thus, demagnetization of a permanent magnet can be reduced even in an operation state in which a current flows only in two of three-phase coils, for example.

BRIEF DESCRIPTION OF THE DRAWINGS

FIG. 12(A) is a schematic diagram illustrating an operation state in which a current flows only in coils of two phases in the Y connection, and FIG. 12(B) is a schematic diagram illustrating a magnetic field acting on permanent magnets in this operation state.

DETAILED DESCRIPTION

First Embodiment (Motor Configuration)

Figure 1:
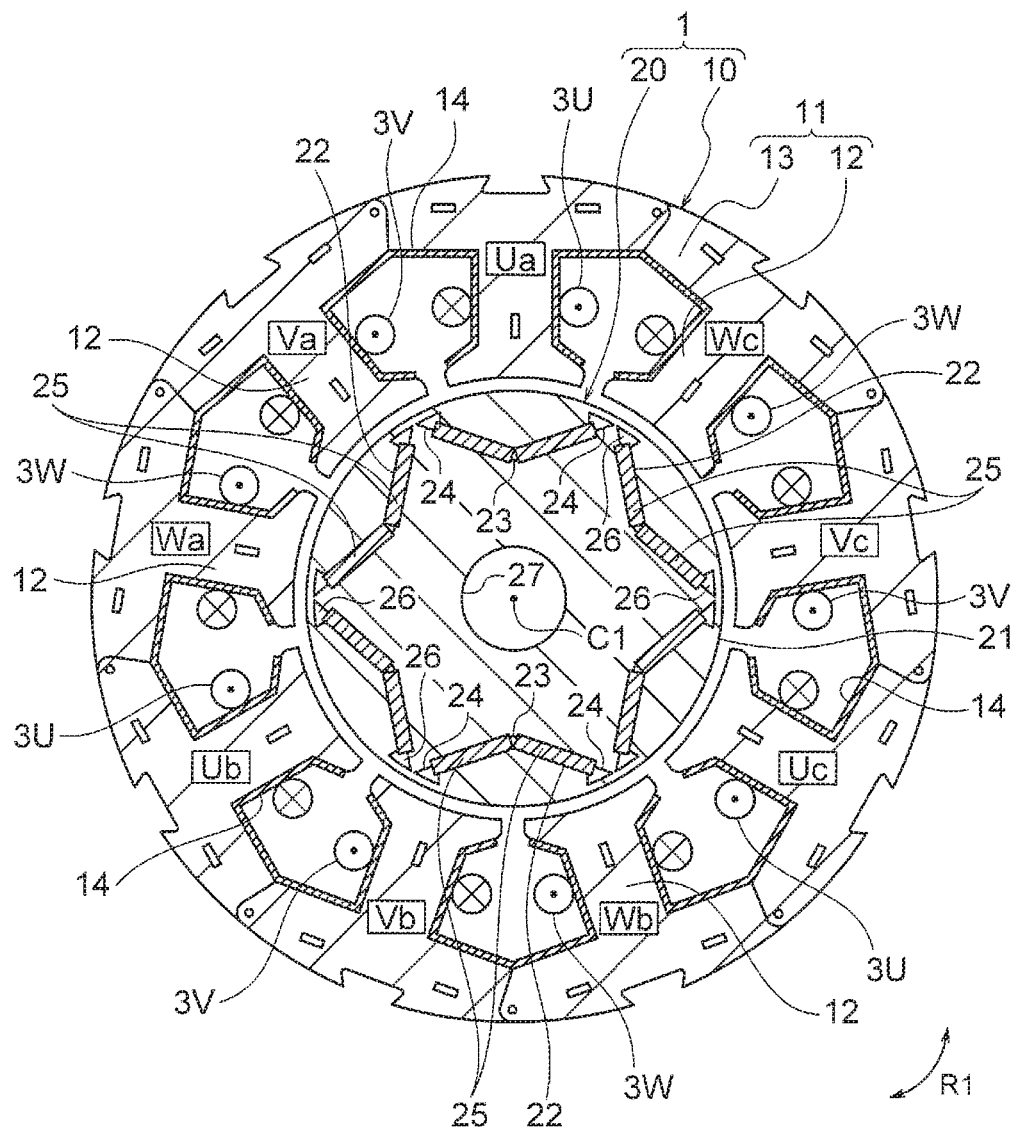
FIG. 1 is a sectional view illustrating a configuration of a motor according to a first embodiment.

A first embodiment of the present invention will be described. FIG. 1 is a sectional view illustrating a configuration of a motor 1 according to the first embodiment of the present invention. The motor 1 is a permanent magnet-embedded motor, and is used for, for example, a rotary compressor. The motor 1 includes a stator 10 and a rotor 20 rotatably disposed on an inner side of the stator 10. An air gap of, for example, 0.3 to 1 mm is formed between the stator 10 and the rotor 20. FIG. 1 is a sectional view in a plane perpendicular to a rotation axis of the rotor 20.

The rotation axis of the rotor 20 will be hereinafter referred to as an "axis C1." A direction of the axis C1 (i.e., a direction of the rotation axis of the rotor 20) will be referred to as an "axial direction." A circumferential direction about the axis C1 (indicated by an arrow R1 in FIG. 1) will be referred to as a "circumferential direction." A radial direction about the axis C1 will be referred to as a radial direction.

The stator 10 includes a stator core 11 and coils 3 wound around the stator core 11. The stator core 11 is obtained by stacking a plurality of electromagnetic steel sheets each having a thickness of 0.1 to 0.7 mm (0.35 mm in this example) in the axial direction and fastening the sheets by crimping.

The stator core 11 has an annular yoke 13 and a plurality of teeth 12 projecting inward in the radial direction from the yoke 13. The number of teeth 12 is nine in this example, but is not limited to nine. Slots are formed each between adjacent two of the teeth 12. The number of slots is equal to the number of teeth 12. Each of the teeth 12 has a tooth tip portion at an inner end in the radial direction, and the tooth tip portion has a wider width (dimension in the circumferential direction).

The coil 3 as a stator winding is wound around each of the teeth 12 via an insulator 14. The coil 3 is obtained by, for example, winding a magnet wire having a wire diameter (diameter) of 0.8 mm around each tooth 12 by concentrated winding in 110 turns. The number of turns and the wire diameter of the coil 3 is determined depending on characteristics (rotation speed, torque or the like) required for the motor 1, a supply voltage, or a cross-sectional area of the slot.

The coils 3 are constituted by three-phase windings of a U-phase, a V-phase, and a W-phase (hereinafter referred to as coils 3U, 3V, and 3W). Both terminals of the coil 3 in each phase are open. That is, the coils 3 have six terminals in total. The connection state of the coils 3 is switchable between a Y connection and a delta connection, which will be described later. The insulator 14 is made of, for example, a film of polyethylene terephthalate (PET), and has a thickness of 0.1 mm to 0.2 mm.

The stator core 11 has a configuration in which a plurality of blocks (referred to as split cores) are coupled to each other via thin portions. Each of the split cores has one tooth. The number of split cores is nine in this example, but is not limited to nine. The magnet wire is wound around each tooth 12 in a state where the stator core 11 is extended in a belt shape, and then the stator core 11 is bent into a ring shape and both ends of the stator core are welded.

As described above, the insulator 14 is made of a thin film and the stator core 11 has a divided structure for facilitating winding. This configuration is effective for increasing the number of turns of the coil 3 in the slot. The stator core 11 is not limited to the configuration in which the plurality of split cores are coupled to each other.

The rotor 20 includes a rotor core 21 and permanent magnets 25 attached to the rotor core 21. The rotor core 21 is obtained by stacking a plurality of electromagnetic steel sheets each having a thickness of 0.1 mm to 0.7 mm (0.35 mm in this example) in the direction of the rotation axis and fastening the sheets by crimping.

The rotor core 21 has a cylindrical shape, and a shaft hole 27 (center hole) is formed at a center of the rotor core 21. A shaft serving as the rotation axis of the rotor 20 (for example, a shaft 90 of a rotary compressor 8 illustrated in FIG. 2) is fixed to the shaft hole 27 by shrinkage fitting, press fitting, or the like.

A plurality of (six in this example) magnet insertion holes 22 in which the permanent magnets 25 are inserted are formed along an outer peripheral surface of the rotor core 21. The magnet insertion holes 22 are openings, and one magnet insertion hole 22 corresponds to one magnetic pole. Since the six magnet insertion holes 22 are provided in this example, the rotor 20 has six poles in total. The number of the magnet insertion holes 22 (i.e., the number of poles) is not limited to six.

Each magnet insertion hole 22 has a V shape such that a center portion in the circumferential direction projects inward in the radial direction in this example. The shape of the magnet insertion hole 22 is not limited to the V shape, and may be a straight shape, for example.

Two permanent magnets 25 are disposed in each magnet insertion hole 22. That is, two permanent magnets 25 are disposed for one magnetic pole. In this example, since the rotor 20 has six poles as described above, twelve permanent magnets 25 are disposed in total.

Each permanent magnet 25 is a flat-plate member elongated in the axial direction of the rotor core 21, has a width in the circumferential direction of the rotor core 21 and a thickness in the radial direction of the rotor core 21. The permanent magnet 25 is constituted by, for example, a rare earth magnet containing neodymium (Nd), iron (Fe), and boron (B) as main components.

Each permanent magnet 25 is magnetized in the thickness direction. Two permanent magnets 25 disposed in one magnet insertion hole 22 are magnetized in such a manner that the same magnetic poles face the same side in the radial direction.

Flux barriers 26 are formed at both ends of the magnet insertion hole 22 in the circumferential direction. The flux barriers 26 are openings formed continuously with the magnet insertion holes 22. The flux barriers 26 are provided for suppressing magnetic flux leakage between adjacent magnetic poles (i.e., magnetic fluxes flowing through interpole parts).

In the rotor core 21, a first magnet retention portion 23 that is a projection is formed at a center of each magnet insertion hole 22 in the circumferential direction. In the rotor core 21, second magnet retention portions 24 that are projections are formed at both ends of the magnet insertion hole 22 in the circumferential direction. The first magnet retention portion 23 and the second magnet retention portions 24 are used for positioning and retaining the permanent magnets 25 in the magnet insertion hole 22.

As described above, the number of slots of the stator 10 (i.e., the number of teeth 12) is nine, and the number of poles of the rotor 20 is six. That is, in the motor 1, a ratio of the number of poles of the rotor 20 to the number of slots of the stator 10 is 2:3.

In the motor 1, the connection state of the coils 3 is switched between a Y connection and a delta connection. In the case where the delta connection is used, a cyclic current may flow and may degrade performance of the motor 1. The cyclic current is caused by a third harmonic wave generated in an induced voltage in the winding of each phase. It is known that in the case of concentrated winding where the ratio of the number of poles to the number of slots is 2:3, no third harmonic wave is generated in the induced voltage on the assumption that there is no influence of magnetic saturation or the like, and thus no performance degradation is caused by the cyclic current.

(Configuration of Rotary Compressor)

Figure 2:
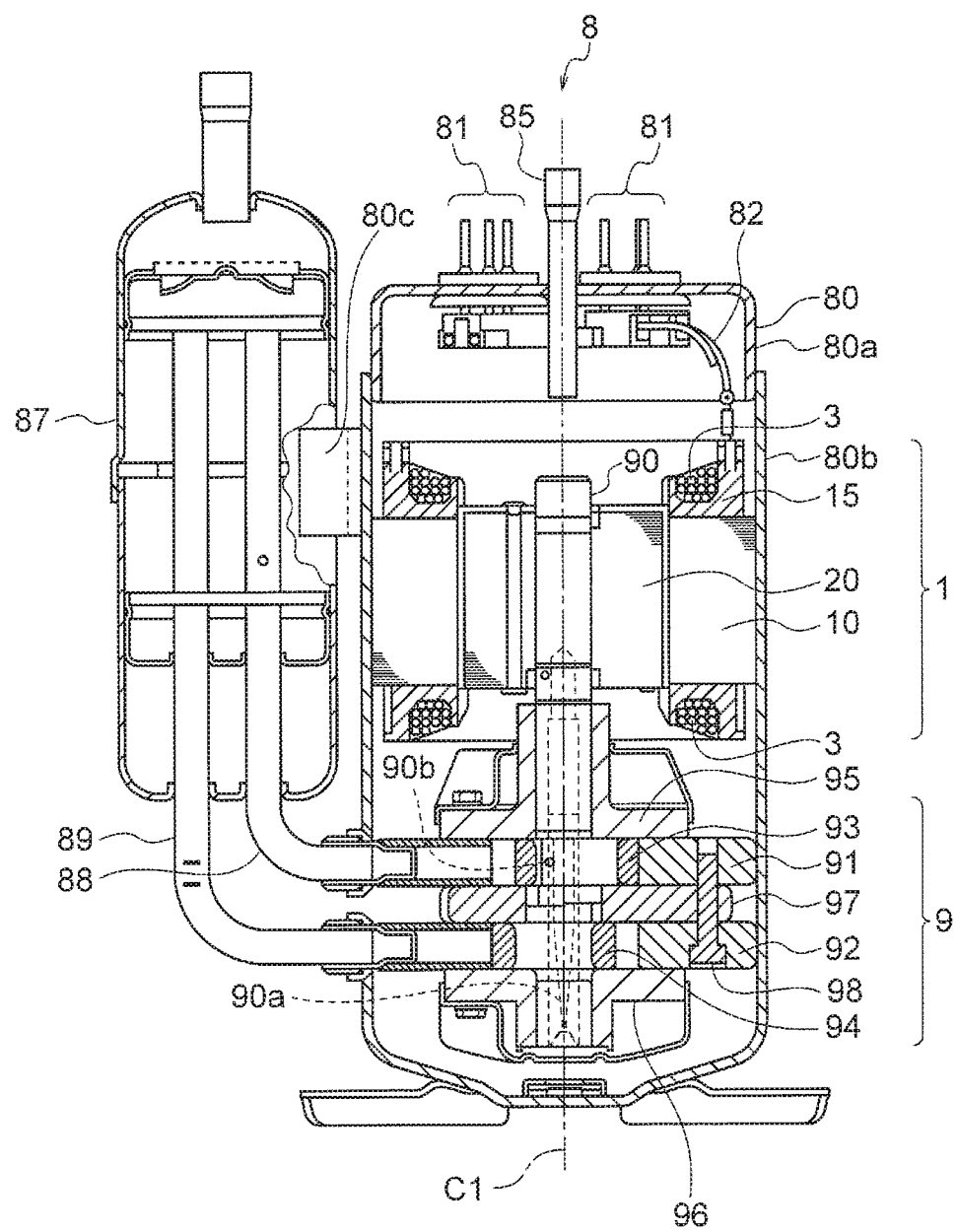
FIG. 2 is a sectional view illustrating a configuration of a rotary compressor according to the first embodiment.

Next, the rotary compressor 8 using the motor 1 will be described. FIG. 2 is a sectional view illustrating a configuration of the rotary compressor 8. The rotary compressor 8 includes a shell 80, a compression mechanism 9 disposed in the shell 80, and the motor 1 for driving the compression mechanism 9. The rotary compressor 8 further includes a shaft 90 (crank shaft) coupling the motor 1 and the compression mechanism 9 to each other so that a driving force can be transferred. The shaft 90 is fitted in the shaft hole 27 (FIG. 1) of the rotor 20 of the motor 1.

The shell 80 is a closed container made of, for example, a steel sheet, and covers the motor 1 and the compression mechanism 9. The shell 80 includes an upper shell 80a and a lower shell 80b. The upper shell 80a is provided with glass terminals 81 serving as a terminal portion for supplying electric power from the outside of the rotary compressor 8 to the motor 1, and a discharge pipe 85 for discharging refrigerant compressed in the rotary compressor 8 to the outside. In this example, total six lead wires are drawn out from the glass terminals 81, and the six lead wires include two wires for each of the U-phase, the V-phase, and the W-phase of the coils 3 of the motor 1 (FIG. 1). The lower shell 80b houses the motor 1 and the compression mechanism 9.

The compression mechanism 9 has an annular first cylinder 91 and an annular second cylinder 92 along the shaft 90. The first cylinder 91 and the second cylinder 92 are fixed to an inner peripheral portion of the shell 80 (the lower shell 80b). An annular first piston 93 is disposed on an inner peripheral side of the first cylinder 91, and an annular second piston 94 is disposed on an inner peripheral side of the second cylinder 92. The first piston 93 and the second piston 94 are rotary pistons that rotate together with the shaft 90.

A partition plate 97 is provided between the first cylinder 91 and the second cylinder 92. The partition plate 97 is a disk-shaped member having a through hole at a center thereof. Vanes (not shown) are provided in cylinder chambers of the first cylinder 91 and the second cylinder 92 to divide each cylinder chamber into a suction side and a compression side. The first cylinder 91, the second cylinder 92, and the partition plate 97 are integrally fixed using bolts 98.

An upper frame 95 is disposed above the first cylinder 91 so as to close an upper side of the cylinder chamber of the first cylinder 91. A lower frame 96 is disposed below the second cylinder 92 so as to close a lower side of the cylinder chamber of the second cylinder 92. The upper frame 95 and the lower frame 96 rotatably support the shaft 90.

Refrigerating machine oil (not shown) for lubricating sliding portions of the compression mechanism 9 is stored at a bottom of the lower shell 80b of the shell 80. The refrigerating machine oil flows upward in a hole 90a formed in the axial direction in the shaft 90 and is supplied to the sliding portions via oil supply holes 90b formed at a plurality of positions of the shaft 90.

The stator 10 of the motor 1 is attached to an inner side of the shell 80 by shrinkage fitting. Electric power is supplied to the coils 3 of the stator 10 via the glass terminals 81 attached to the upper shell 80a. The shaft 90 is fixed to the shaft hole 27 (FIG. 1) of the rotor 20.

An accumulator 87 for storing refrigerant gas is attached to the shell 80. The accumulator 87 is held by, for example, a holding portion 80c provided on an outer side of the lower shell 80b. A pair of suction pipes 88 and 89 are attached to the shell 80, and refrigerant gas is supplied from the accumulator 87 to the cylinders 91 and 92 through the suction pipes 88 and 89.

As the refrigerant, R410A, R407C, or R22, for example, may be used. From the viewpoint of prevention of global warming, it is preferable to use low global warming potential (GWP) refrigerant. As the low-GWP refrigerant, for example, the following refrigerants can be used.

(1) First, a halogenated hydrocarbon having a double bond of carbon in its composition, such as hydro-fluoro-orefin (HFO)-1234yf ($CF_3CF=CH_2$) can be used. The GWP of HFO-1234yf is 4.

(2) Further, a hydrocarbon having a double bond of carbon in its composition, such as R1270 (propylene), may be used. The GWP of R1270 is 3, which is lower than that of HFO-1234yf, but flammability of R1270 is higher than that of HFO-1234yf.

(3) Further, a mixture containing at least one of a halogenated hydrocarbon having a double bond of carbon in its composition or a hydrocarbon having a double bond of carbon in its composition, such as a mixture of HFO-1234yf and R32, may be used. Since the above described HFO-1234yf is a low-pressure refrigerant and tends to cause an increase in pressure loss, its use may cause degradation of performance of a refrigeration cycle (especially, an evaporator). Thus, it is practically preferable to use a mixture with R32 or R41, which is a higher pressure refrigerant than HFO-1234yf.

A basic operation of the rotary compressor 8 is as follows. Refrigerant gas supplied from the accumulator 87 is supplied to the cylinder chambers of the first cylinder 91 and the second cylinder 92 through the suction pipes 88 and 89. When the motor 1 is driven and the rotor 20 rotates, the shaft 90 rotates together with the rotor 20. Then, the first piston 93 and the second piston 94 fitted to the shaft 90 rotate eccentrically in the cylinder chambers and compress the refrigerant in the cylinder chambers. The compressed refrigerant flows upward in the shell 80 through holes (not shown) provided in the rotor 20 of the motor 1 and is discharged to the outside from the discharge pipe 85.

The compressor for which the motor 1 is used is not limited to the rotary compressor, but may be a scroll compressor, for example.

(Configuration of Air Conditioner)

Figure 3:
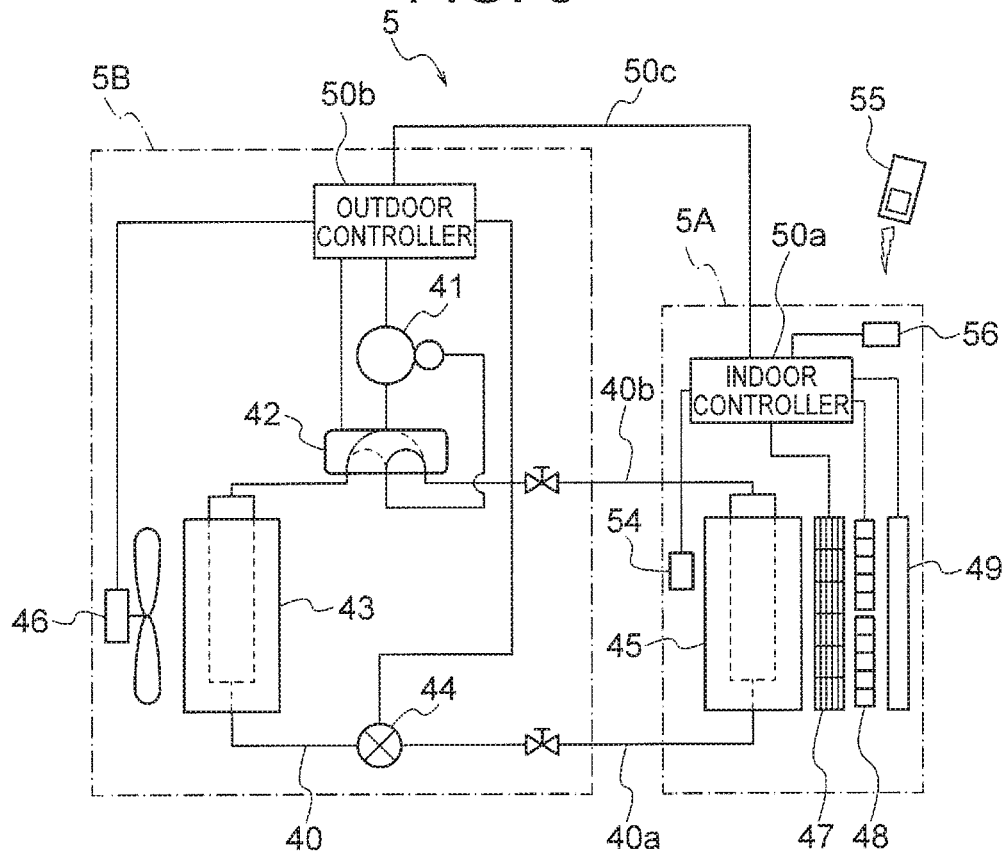
FIG. 3 is a block diagram illustrating a configuration of an air conditioner according to the first embodiment.

Next, the air conditioner 5 including the driving device according to the first embodiment will be described. FIG. 3 is a block diagram illustrating a configuration of the air conditioner 5. The air conditioner 5 includes an indoor unit 5A placed in a room (air conditioning target space) and an outdoor unit 5B placed outdoors. The indoor unit 5A and the outdoor unit 5B are connected by connecting pipes 40a and 40*b* through which refrigerant flows. Liquid refrigerant passing through a condenser flows through the connection pipe 40*a*. Gas refrigerant passing through an evaporator flows through the connection pipe 40*b*.

The outdoor unit 5B includes a compressor 41 that compresses and discharges refrigerant, a four-way valve (refrigerant channel switching valve) 42 that switches a flow direction of the refrigerant, an outdoor heat exchanger 43 that exchanges heat between outside air and the refrigerant, and an expansion valve (decompression device) 44 that depressurizes high-pressure refrigerant to a low pressure. The compressor 41 is constituted by the rotary compressor 8 (FIG. 2) described above. The indoor unit 5A includes an indoor heat exchanger 45 that performs heat exchange between indoor air and the refrigerant.

The compressor 41, the four-way valve 42, the outdoor heat exchanger 43, the expansion valve 44, and the indoor heat exchanger 45 are connected by a pipe 40 including the above described connection pipes 40*a* and 40*b* to constitute a refrigerant circuit. These components constitute a compression type refrigeration cycle (compression type heat pump cycle) in which refrigerant is circulated by the compressor 41.

In order to control an operation of the air conditioner 5, an indoor controller 50*a* is disposed in the indoor unit 5A, and an outdoor controller 50*b* is disposed in the outdoor unit 5B. Each of the indoor controller 50*a* and the outdoor controller 50*b* has a control board on which various circuits for controlling the air conditioner 5 are formed. The indoor controller 50*a* and the outdoor controller 50*b* are connected to each other by a communication cable 50*c*. The communication cable 50*c* is bundled together with the connecting pipes 40*a* and 40*b* described above.

In the outdoor unit 5B, an outdoor fan 46 that is a fan is disposed so as to face the outdoor heat exchanger 43. The outdoor fan 46 rotates to generate an air flow passing through the outdoor heat exchanger 43. The outdoor fan 46 is constituted by, for example, a propeller fan.

The four-way valve 42 is controlled by the outdoor controller 50*b* and switches the direction of flow of refrigerant. When the four-way valve 42 is in the position indicated by the solid line in FIG. 3, gas refrigerant discharged from the compressor 41 is sent to the outdoor heat exchanger 43 (condenser). When the four-way valve 42 is in the position indicated by the broken line in FIG. 3, gas refrigerant flowing from the outdoor heat exchanger 43 (evaporator) is sent to the compressor 41. The expansion valve 44 is controlled by the outdoor controller 50*b*, and changes its opening degree to reduce the pressure of high-pressure refrigerant to a low pressure.

In the indoor unit 5A, an indoor fan 47 that is a fan is disposed so as to face the indoor heat exchanger 45. The indoor fan 47 rotates to generate an air flow passing through the indoor heat exchanger 45. The indoor fan 47 is constituted by, for example, a crossflow fan.

In the indoor unit 5A, an indoor temperature sensor 54 as a temperature sensor is provided. The indoor temperature sensor 54 measures an indoor temperature Ta, which is an air temperature in the room (air conditioning target space), and sends information (information signal) on the measured temperature to the indoor controller 50*a*. The indoor temperature sensor 54 may be constituted by a temperature sensor used in a general air conditioner. It is also possible to use a radiant temperature sensor detecting a surface temperature of a wall, a floor or the like in a room.

In the indoor unit 5A, a signal receiver 56 is also provided. The signal receiver 56 receives an instruction signal (operation instruction signal) transmitted from a remote controller 55 (remote operation device) serving as an operation unit operated by a user. The remote controller 55 is used by the user to give an instruction of an operation input (start and stop of operation) or operation content (set temperature, wind speed, or the like) to the air conditioner 5.

The compressor 41 is configured to be capable of changing an operating rotation speed in a range from 20 rps to 130 rps during a normal operation. As the rotation speed of the compressor 41 increases, a circulation amount of refrigerant in the refrigerant circuit increases. The rotation speed of the compressor 41 is controlled by the controller 50 (more specifically, the outdoor controller 50*b*) in accordance with a temperature difference $\Delta T$ between the current indoor temperature Ta obtained by the indoor temperature sensor 54 and a set temperature Ts set by the user with the remote controller 55. As the temperature difference $\Delta T$ increases, the compressor 41 rotates at a higher rotation speed to increase the circulation amount of refrigerant.

Rotation of the indoor fan 47 is controlled by the indoor controller 50*a*. The rotation speed of the indoor fan 47 can be switched to a plurality of stages. In this example, the rotation speed can be switched to, for example, three stages of strong wind, middle wind, and soft wind. When the wind speed setting is set to an automatic mode with the remote controller 55, the rotation speed of the indoor fan 47 is switched in accordance with the temperature difference $\Delta T$ between the measured indoor temperature Ta and the set temperature Ts.

Rotation of the outdoor fan 46 is controlled by the outdoor controller 50*b*. The rotation speed of the outdoor fan 46 can be switched to a plurality of stages. In this example, the rotation speed of the outdoor fan 46 is switched in accordance with the temperature difference $\Delta T$ between the measured indoor temperature Ta and the set temperature Ts.

The indoor unit 5A further includes a lateral wind direction plate 48 and a vertical wind direction plate 49. The lateral wind direction plate 48 and the vertical wind direction plate 49 change a blowing direction when conditioned air subjected to heat exchange in the indoor heat exchanger 45 is blown into the room by the indoor fan 47. The lateral wind direction plate 48 changes the blowing direction laterally, and the vertical wind direction plate 49 changes the blowing direction vertically. An angle of each of the lateral wind direction plate 48 and the vertical wind direction plate 49, i.e., a wind direction of the blown air is controlled by the indoor controller 50*a* based on the setting of the remote controller 55.

The basic operation of the air conditioner 5 is as follows. In a cooling operation, the four-way valve 42 is switched to a position indicated by the solid line, and high-temperature and high-pressure gas refrigerant discharged from the compressor 41 flows into the outdoor heat exchanger 43. In this case, the outdoor heat exchanger 43 operates as a condenser. When air passes through the outdoor heat exchanger 43 by rotation of the outdoor fan 46, heat of condensation of the refrigerant is taken by the air through heat exchange. The refrigerant is condensed into high-pressure and low-temperature liquid refrigerant, and is adiabatically expanded by the expansion valve 44 to become low-pressure and low-temperature two-phase refrigerant.

The refrigerant passing through the expansion valve 44 flows into the indoor heat exchanger 45 of the indoor unit 5A. The indoor heat exchanger 45 operates as an evaporator. When air passes through the indoor heat exchanger 45 by rotation of the indoor fan 47, the air is deprived of heat of vaporization by the refrigerant through heat exchange, and the cooled air is supplied to the room. The refrigerant evaporates to become low-temperature and low-pressure gas refrigerant, and is compressed again into high-temperature and high-pressure refrigerant by the compressor 41.

In a heating operation, the four-way valve 42 is switched to a position indicated by the dotted line, and high-temperature and high-pressure gas refrigerant discharged from the compressor 41 flows into the indoor heat exchanger 45. In this case, the indoor heat exchanger 45 operates as a condenser. When air passes through the indoor heat exchanger 45 by rotation of the indoor fan 47, the air takes heat of condensation from the refrigerant through heat exchange, and the heated air is supplied to the room. The refrigerant is condensed into high-pressure and low-temperature liquid refrigerant, and is adiabatically expanded by the expansion valve 44 to become low-pressure and low-temperature two-phase refrigerant.

The refrigerant passing through the expansion valve 44 flows into the outdoor heat exchanger 43 of the outdoor unit 5B. The outdoor heat exchanger 43 operates as an evaporator. When air passes through the outdoor heat exchanger 43 by rotation of the outdoor fan 46, the air is deprived of heat of vaporization by the refrigerant through heat exchange. The refrigerant evaporates to become low-temperature and low-pressure gas refrigerant, and is compressed again into high-temperature and high-pressure refrigerant by the compressor 41.

Figure 4:
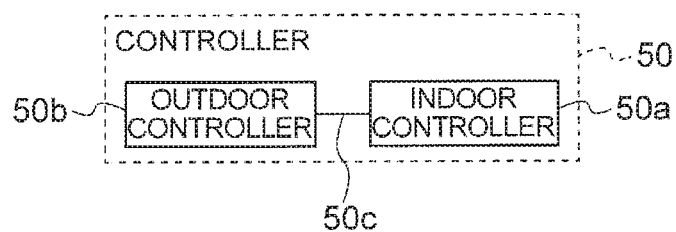
FIG. 4 is a conceptual diagram illustrating a basic configuration of a control system of the air conditioner according to the first embodiment.

FIG. 4 is a conceptual diagram showing a basic configuration of a control system of the air conditioner 5. The indoor controller 50a and the outdoor controller 50b described above exchange information with each other through the communication cable 50c to control the air conditioner 5. In this example, the indoor controller 50a and the outdoor controller 50b are collectively referred to as a controller 50.

Figure 5A:
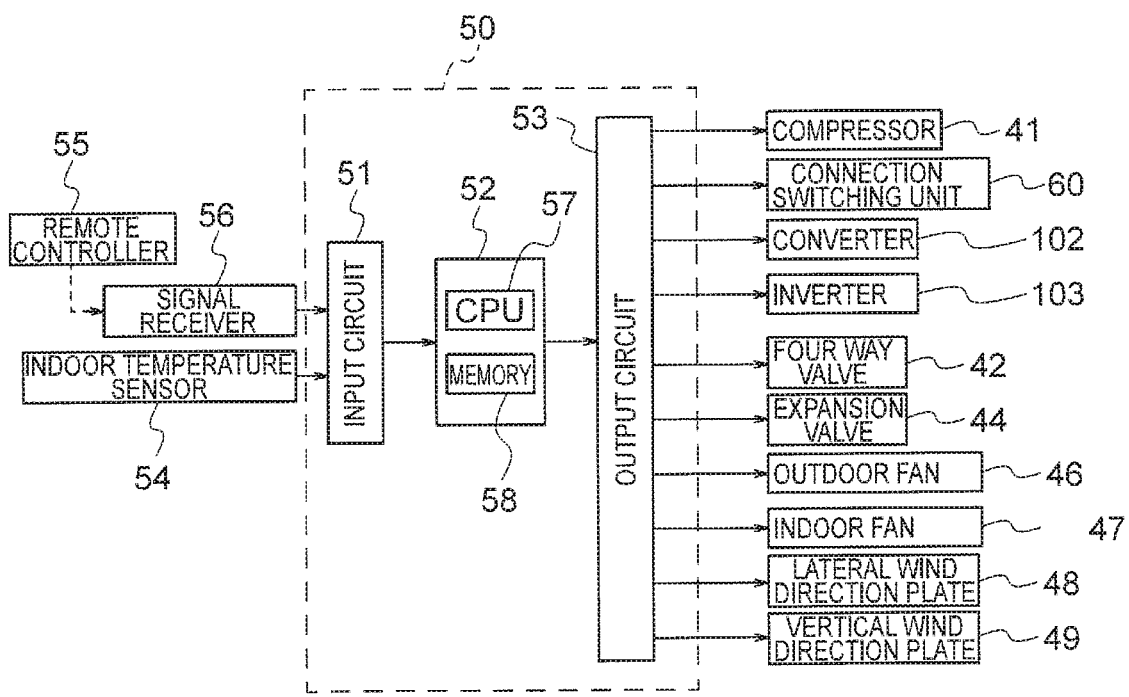
FIG. 5(A) is a block diagram illustrating the control system of the air conditioner according to the first embodiment.

FIG. 5(A) is a block diagram showing a control system of the air conditioner 5. The controller 50 is constituted by, for example, a microcomputer. The controller 50 incorporates an input circuit 51, an arithmetic circuit 52, and an output circuit 53.

The input circuit 51 receives an instruction signal received by the signal receiver 56 from the remote controller 55. The instruction signal includes, for example, signals for setting an operation input, an operation mode, a set temperature, an airflow rate, or a wind direction. The input circuit 51 also receives temperature information indicating an indoor temperature detected by the indoor temperature sensor 54. The input circuit 51 outputs the received information to the arithmetic circuit 52.

The arithmetic circuit 52 includes a central processing unit (CPU) 57 and a memory 58. The CPU 57 performs calculation processing and determination processing. The memory 58 stores various set values and programs for use in controlling the air conditioner 5. The arithmetic circuit 52 performs calculation and determination based on the information received from the input circuit 51, and outputs the result to the output circuit 53.

The output circuit 53 includes a control section that controls the compressor 41, a connection switching unit 60 (described later), a converter 102, an inverter 103, the compressor 41, the four-way valve 42, the expansion valve 44, the outdoor fan 46, the indoor fan 47, the lateral wind direction plate 48, and the vertical wind direction plate 49, based on the information input from the arithmetic circuit 52. The output circuit 53 includes, for example, an inverter driving circuit 111 (FIG. 6) for driving the inverter 103 described later.

As described above, the indoor controller 50a and the outdoor controller 50b (FIG. 4) exchange information with each other through the communication cable 50c and control the various devices of the indoor unit 5A and the outdoor unit 5B. Thus, in this example, the indoor controller 50a and the outdoor controller 50b are collectively referred to as the controller 50. Practically, each of the indoor controller 50a and the outdoor controller 50b is constituted by a microcomputer. A controller may be provided in only one of the indoor unit 5A and the outdoor unit 5B to control various devices of the indoor unit 5A and the outdoor unit 5B.

Figure 5B:
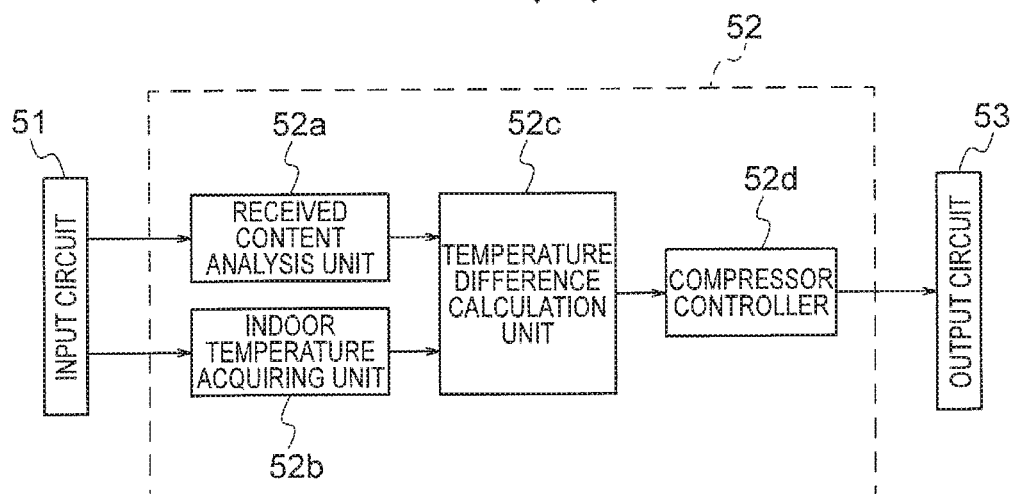
FIG. 5(B) is a block diagram illustrating a section that controls the motor of the compressor based on an indoor temperature.

FIG. 5(B) is a block diagram showing a section of the controller 50 for controlling the motor 1 of the compressor 41 based on the indoor temperature Ta. The arithmetic circuit 52 of the controller 50 includes a received content analysis unit 52a, an indoor temperature acquiring unit 52b, a temperature difference calculation unit 52c, and a compressor controller 52d. These components are included in, for example, the CPU 57 of the arithmetic circuit 52.

The received content analysis unit 52a analyzes an instruction signal input from the remote controller 55 via the signal reception unit 56 and the input circuit 51. Based on the analysis result, the received content analysis unit 52a outputs, for example, the operation mode and the set temperature Ts to the temperature difference calculation unit 52c. The indoor temperature acquiring unit 52b acquires the indoor temperature Ta input from the indoor temperature sensor 54 via the input circuit 51, and outputs the acquired indoor temperature Ta to the temperature difference calculation unit 52c.

The temperature difference calculation unit 52c calculates a temperature difference ΔT between the indoor temperature Ta input from the indoor temperature acquiring unit 52b and the set temperature Ts input from the received content analysis unit 52a. If the operation mode input from the received content analysis unit 52a is the heating operation, a temperature difference ΔT=Ts−Ta is calculated. If the operation mode is a cooling operation, a temperature difference ΔT=Ta−Ts is calculated. The temperature difference calculation unit 52c outputs the calculated temperature difference ΔT to the compressor controller 52d.

Based on the temperature difference ΔT input from the temperature difference calculation unit 52c, the compressor controller 52d controls the driving device 100 to thereby control the rotation speed of the motor 1 (i.e., the rotation speed of the compressor 41).

<Configuration of Driving Device>

Figure 6:
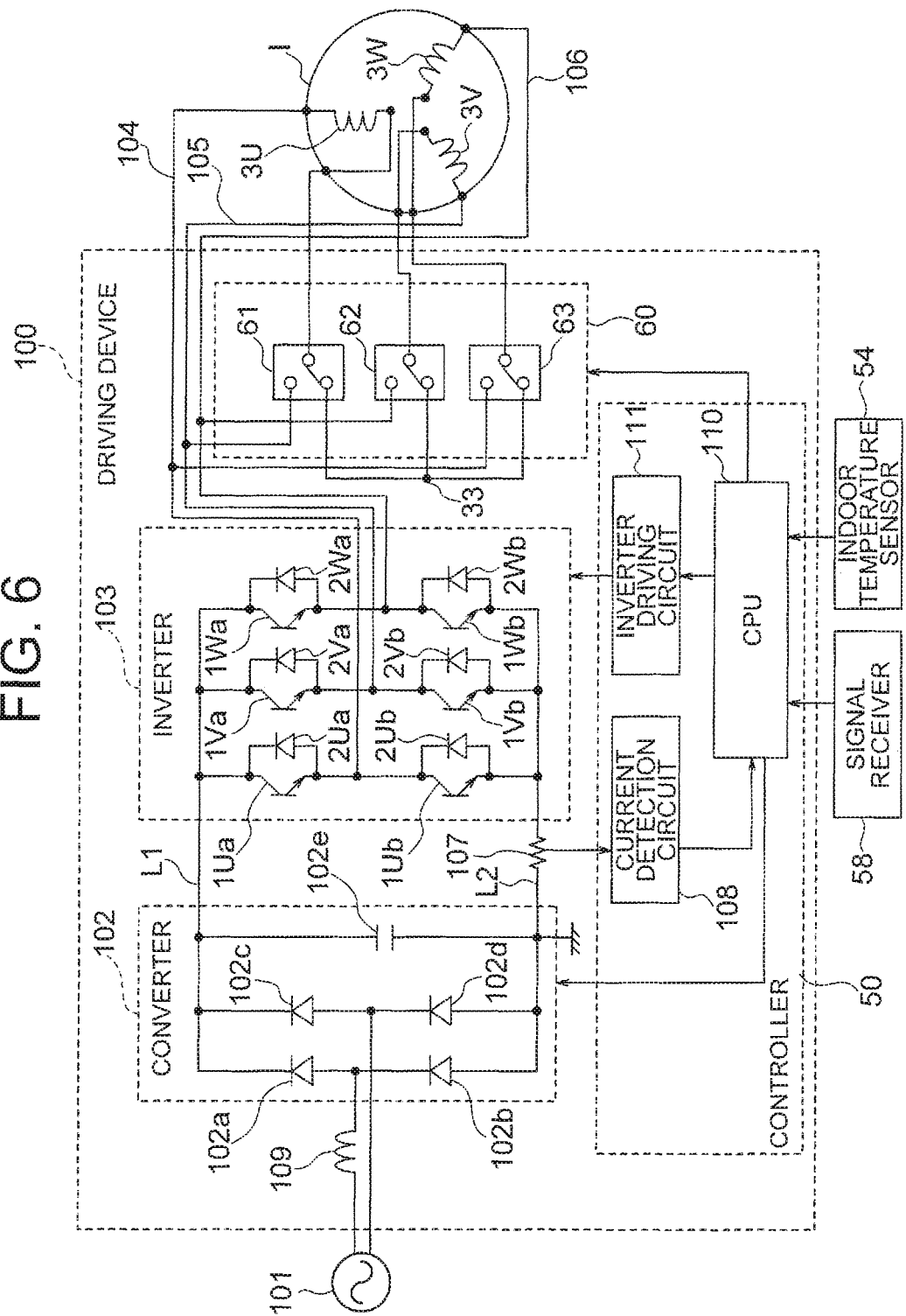
FIG. 6 is a block diagram illustrating a configuration of a driving device according to the first embodiment.

Next, the driving device 100 for driving the motor 1 will be described. FIG. 6 is a block diagram illustrating a configuration of the driving device 100 and the motor 1. The driving device 100 includes the converter 102 for rectifying an output of a power supply 101, the inverter 103 for outputting an alternating-current (AC) voltage to the coils 3 of the motor 1, the connection switching unit 60 for switching the connection state of the coils 3, and the controller 50. The power supply 101 is, for example, an AC power supply of 200 V (effective voltage).

The controller 50 includes a current detection circuit 108 for detecting a current at an input side or an output side of the inverter 103, an inverter driving circuit 111 for driving the inverter 103, and a CPU 110 as an inverter controller.

The converter 102 is a rectifier circuit that receives an AC voltage from the power supply 101 via a reactor 109, rectifies and smooths the AC voltage, and outputs a DC voltage via buses L1 and L2. The converter 102 includes bridge diodes 102a, 102b, 102c, and 102d for rectifying the AC voltage and a smoothing capacitor 102e for smoothing the output voltage. A voltage output from the converter 102 will be referred to as a bus voltage. An output voltage of the converter 102 is controlled by the controller 50.

Input terminals of the inverter 103 are connected to the buses L1 and L2 of the converter 102. Output terminals of the inverter 103 are respectively connected to three-phase coils 3U, 3V, and 3W of the motor 1 through U-phase, V-phase, and W-phase wires (output lines) 104, 105, and 106.

The inverter 103 includes a first U-phase switching element 1Ua, a second U-phase switching element 1Ub, a first V-phase switching element 1Va, a second V-phase switching element 1Vb, a first W-phase switching element 1Wa, and a second W-phase switching element 1Wb.

The first U-phase switching element 1Ua corresponds to a U-phase upper arm, and the second U-phase switching element 1Ub corresponds to a U-phase lower arm. The first U-phase switching element 1Ua and the second U-phase switching element 1Ub are connected to the U-phase wire 104. The first U-phase switching element 1Ua is connected to a first U-phase diode 2Ua in parallel, and the second U-phase switching element 1Ub is connected to a second U-phase diode 2Ub in parallel.

The first V-phase switching element 1Va corresponds to a V-phase upper arm, and the second V-phase switching element 1Vb corresponds to a V-phase lower arm. The first V-phase switching element 1Va and the second V-phase switching element 1Vb are connected to the V-phase wire 105. The first V-phase switching element 1Va is connected to a first V-phase diode 2Va in parallel, and the second V-phase switching element 1Vb is connected to a second V-phase diode 2Vb in parallel.

The first W-phase switching element 1Wa corresponds to a W-phase upper arm, and the second W-phase switching element 1Wb corresponds to a W-phase lower arm. The first W-phase switching element 1Wa and the second W-phase switching element 1Wb are connected to the W-phase wire 106. The first W-phase switching element 1Wa is connected to a first W-phase diode 2Wa in parallel, and the second W-phase switching element 1Wb is connected to a second W-phase diode 2Wb in parallel.

Each of the switching elements 1Ua through 1Wb can be constituted by, for example, a transistor such as an insulated gate bipolar transistor (IGBT). Turning on and off of each of the switching elements 1Ua through 1Wb is controlled by a driving signal from the inverter driving circuit 111.

Based on a pulse width modulation (PWM) signal input from the CPU 110, the inverter driving circuit 111 produces a driving signal for turning on and off each of the switching elements 1Ua through 1Wb of the inverter 103, and outputs the driving signal to the inverter 103. The inverter driving circuit 111 is a part of the output circuit 53 (FIG. 5(A)).

A resistor 107 is connected to an input side of the inverter 103 (for example, the bus L2 from the converter 102), and the current detection circuit 108 is connected to the resistor 107. The current detection circuit 108 is a current detector for detecting a current value of a current at an input side of the inverter 103 (i.e., a bus current of the converter 102). In this example, a shunt resistor is used as the current detection circuit 108. The current detection circuit 108 is not limited to this example, and may be configured to detect a current value of a current (phase current) at an output side of the inverter 103. The current detection circuit 108 is not limited to the shunt resistor, and may be a Hall element or a transformer (using electromagnetic induction).

The CPU 110 as an inverter controller is configured to control the inverter 103 and the connection switching unit 60. The CPU 110 receives an operation instruction signal from a remote controller 55 received by the signal receiver 56, an indoor temperature detected by the indoor temperature sensor 54, and a current value from the current detection circuit 108.

Based on the received information, the CPU 110 outputs a voltage switching signal to the converter 102, outputs an inverter driving signal (PWM signal) to the inverter 103, outputs a connection switching signal to the connection switching unit 60, and outputs a voltage switching signal to the converter 102. The CPU 110 corresponds to the CPU 57 illustrated in FIG. 5(A).

Figure 7:
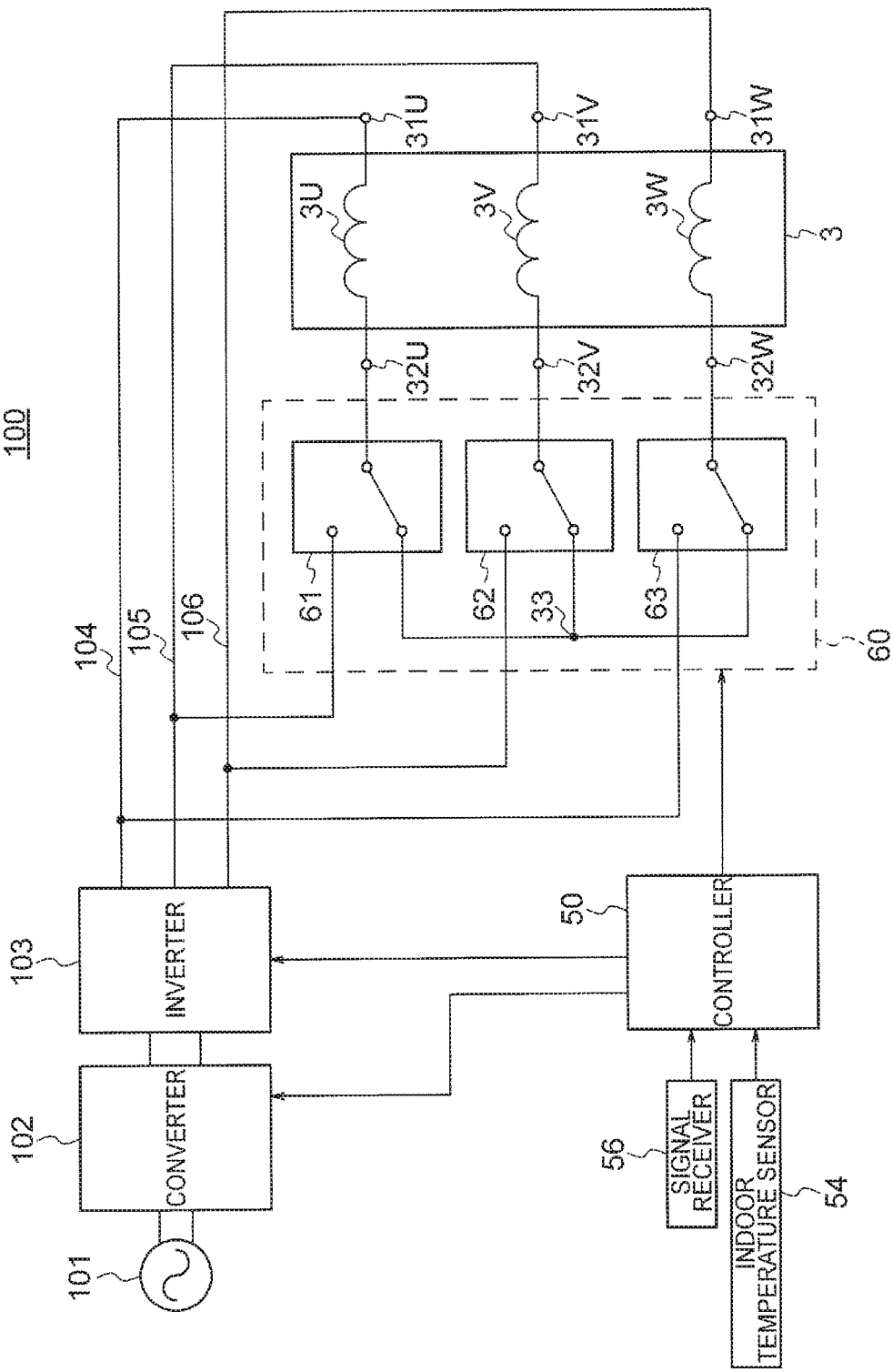
FIG. 7 is a block diagram illustrating a configuration of the driving device according to the first embodiment.

Next, the coils 3 and connection switching of the coils 3 will be described. FIG. 7 is a diagram illustrating a configuration of the driving device 100. In FIG. 7, each of the converter 102, the inverter 103, and the controller 50 is illustrated as one block. The connection switching unit 60 switches the connection state of the coils 3 between a Y connection and a delta connection.

Among the three-phase coils 3U, 3V, and 3W of the motor 1, the coil 3U has terminals 31U and 32U, the coil 3V has terminals 31V and 32V, and the coil 3W has terminals 31W and 32W. The wire 104 is connected to the terminal 31U of the coil 3U. The wire 105 is connected to the terminal 31V of the coil 3V. The wire 106 is connected to the terminal 31W of the coil 3W.

Figure 19:
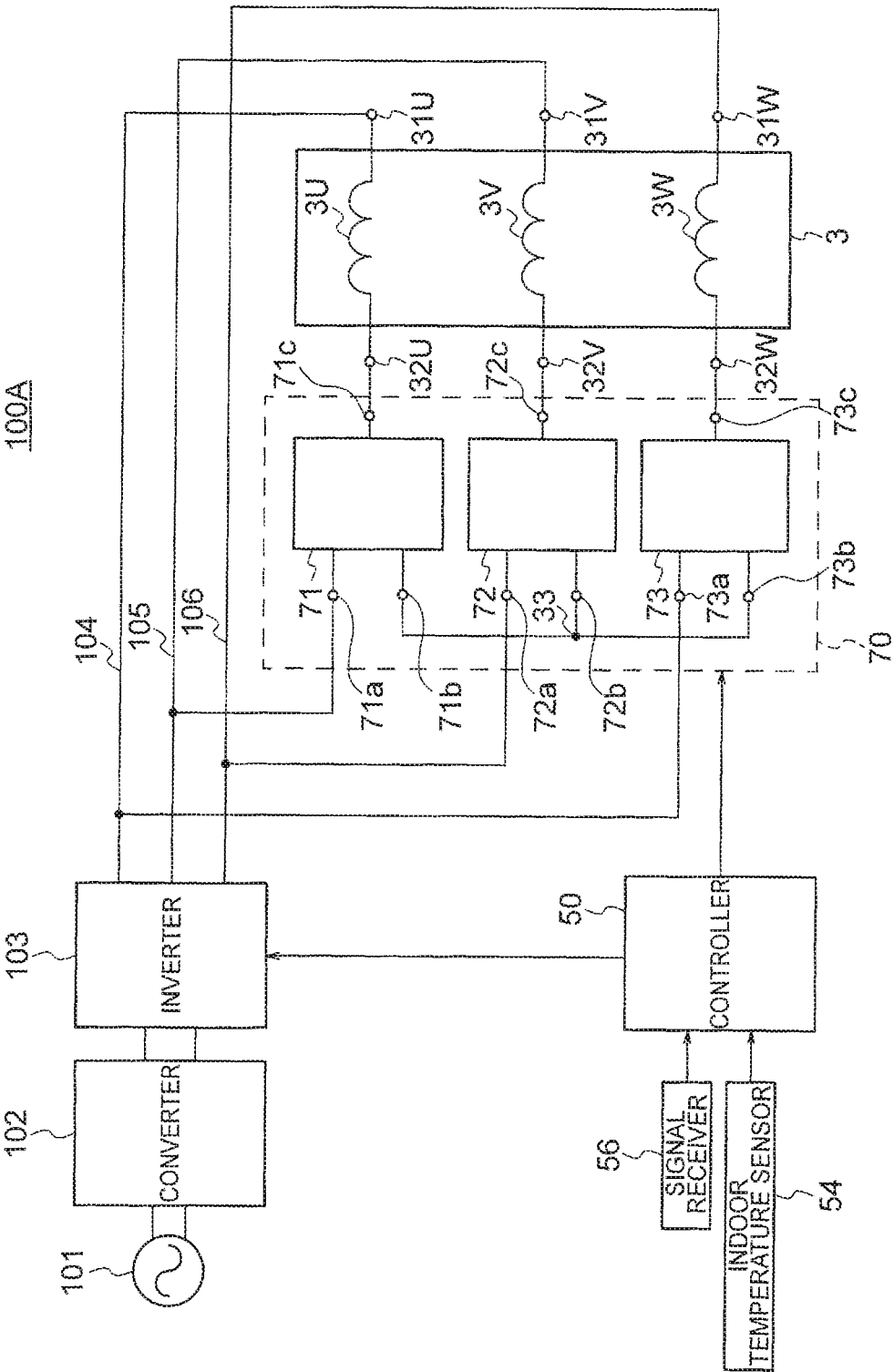
FIG. 19 is a block diagram illustrating a configuration of a driving device according to a variation of the first embodiment.

The connection switching unit 60 has switches 61, 62, and 63 each of which is constituted by a relay contact. The switch 61 connects the terminal 32U of the coil 3U to either the wire 105 or a neutral point 33 (common contact). The switch 62 connects the terminal 32V of the coil 3V to either the wire 106 or the neutral point 33. The switch 63 connects the terminal 32W of the coil 3V to either the wire 104 or the neutral point 33. The switches 61, 62, and 63 of the connection switching unit 60 may be constituted by semiconductor switches, which will be described in a variation (FIG. 19).

In the state shown in FIG. 7, the switch 61 connects the terminal 32U of the coil 3U to the neutral point 33, the switch 62 connects the terminal 32V of the coil 3V to the neutral point 33, and the switch 63 connects the terminal 32W of the coil 3W to the neutral point 33. That is, the terminals 31U, 31V, and 31W of the coils 3U, 3V, and 3W are connected to the inverter 103, and the terminals 32U, 32V, and 32W are connected to the neutral point 33.

Figure 8:
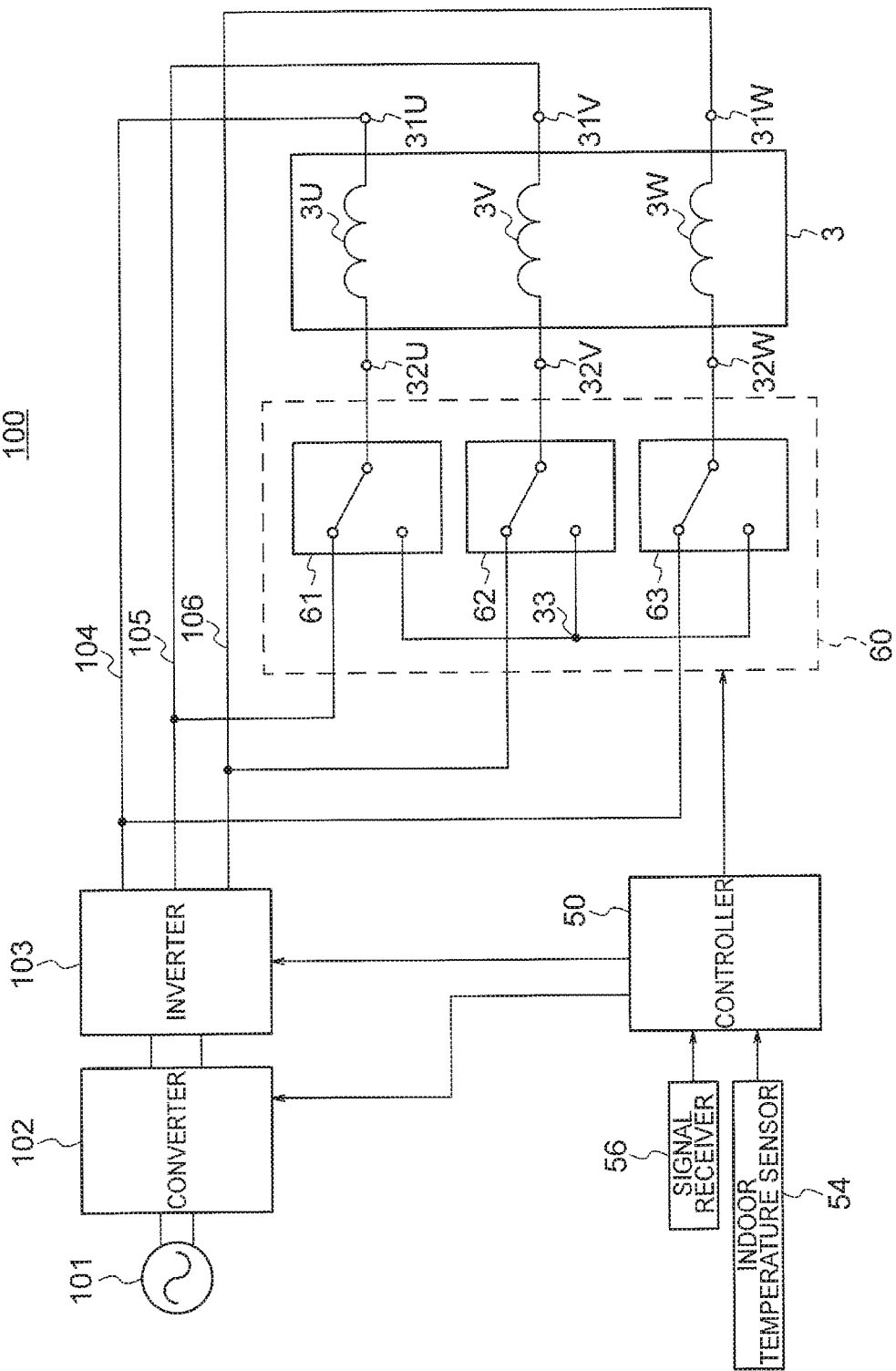
FIG. 8 is a block diagram illustrating the configuration of the driving device of the first embodiment.

FIG. 8 is a block diagram illustrating a state where the switches 61, 62, and 63 of the connection switching unit 60 in the driving device 100 are switched. In the state illustrated in FIG. 8, the switch 61 connects the terminal 32U of the coil 3U to the wire 105, the switch 62 connects the terminal 32V of the coil 3V to the wire 106, and the switch 63 connects the terminal 32W of the coil 3W to the wire 104.

Figure 9A:
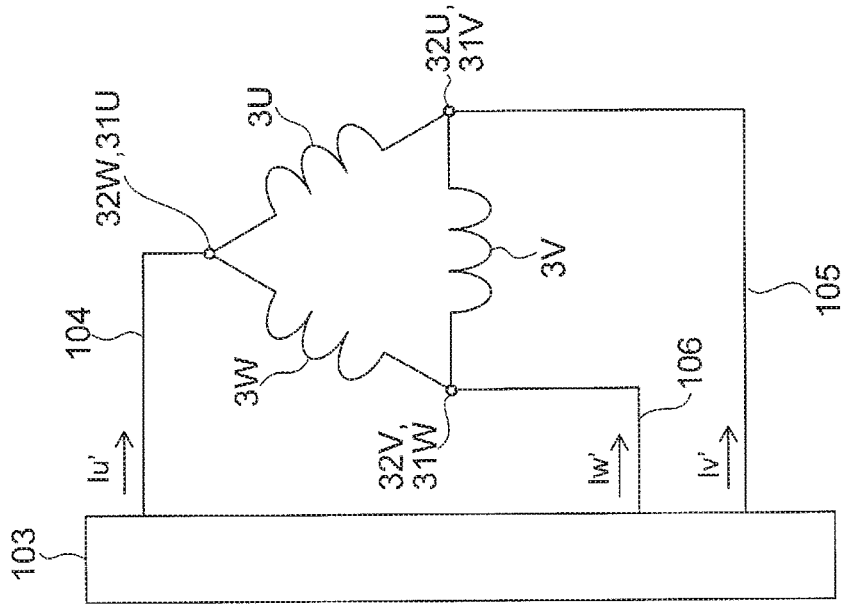
FIGS. 9(A) and 9(B) are schematic diagrams illustrating a switching operation of a connection state of coils according to the first embodiment.

FIG. 9(A) is a schematic diagram illustrating a connection state of the coils 3U, 3V, and 3W when the switches 61, 62, and 63 are in the state shown in FIG. 7. The coils 3U, 3V, and 3W are connected to the neutral point 33 at the terminals 32U, 32V, and 32W, respectively. Thus, the connection state of the coils 3U, 3V, and 3W is the Y connection (star connection).

Figure 9B:
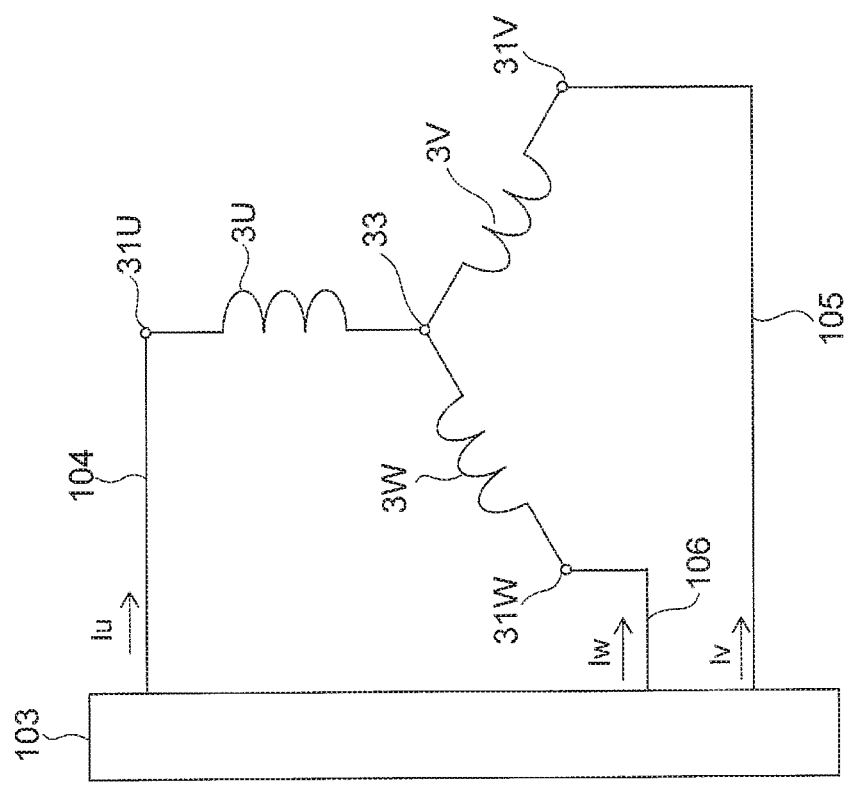

FIG. 9(B) is a schematic diagram illustrating a connection state of the coils 3U, 3V, and 3W when the switches 61, 62, and 63 are in the state shown in FIG. 8. The terminal 32U of the coil 3U is connected to the terminal 31V of the coil 3V via the wire 105 (FIG. 8). The terminal 32V of the coil 3V is connected to the terminal 31W of the coil 3W via the wire 106 (FIG. 8). The terminal 32W of the coil 3W is connected to the terminal 31U of the coil 3U via the wire 104 (FIG. 8). Thus, the connection state of the coils 3U, 3V, and 3W is the delta connection.

In this manner, the connection switching unit 60 switches the connection state of the coils 3U, 3V, and 3W of the motor 1 between the Y connection (first connection state) and the delta connection (second connection state) by switching the switches 61, 62, and 63.

Figure 10:
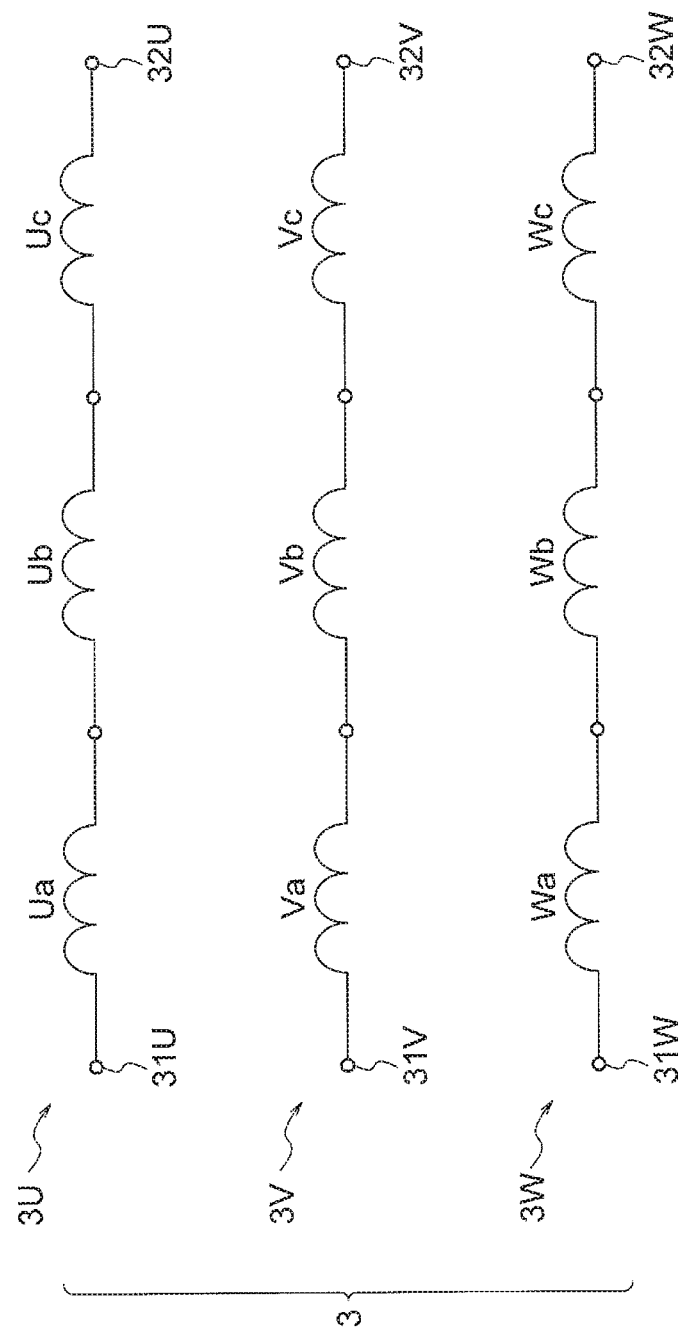
FIG. 10 is a schematic diagram illustrating a connection state of the coils according to the first embodiment.

FIG. 10 is a schematic diagram illustrating coil portions of the coils 3U, 3V, and 3W. As described above, the motor 1 has nine teeth 12 (FIG. 1), and each of the coils 3U, 3V, and 3W is wound around three teeth 12. That is, the coil 3U is obtained by connecting, in series, U-phase coil portions Ua, Ub, and Uc wound around the three teeth 12. Similarly, the coil 3V is obtained by connecting, in series, V-phase coil portions Va, Vb, and Vc wound around the three teeth 12. The coil 3W is obtained by connection, in series, W-phase coil portions Wa, Wb, and Wc wound around the three teeth 12.

In the motor 1 of the first embodiment, a ratio of the number of poles to the number of slots is 2:3, and the coils 3 are wound by concentrated winding. In this configuration, the number of turns of the coil 3 wound around each tooth 12 is the same, and the winding direction of the coil 3 wound around each tooth 12 is the same. The coil portions Ua, Va, Wa, Ub, Vb, Wb, Uc, Vc, and Wc are arranged in this order in the circumferential direction (see FIG. 1).

<Configuration for Overcurrent Protection>

Next, a configuration for overcurrent protection in the driving device 100 according to the first embodiment will be described. The "overcurrent protection" refers to controlling of a current value of the inverter 103 so as not to exceed an overcurrent threshold (also referred to as an overcurrent protection level) in order to reduce demagnetization of the permanent magnets 25.

Figure 11:
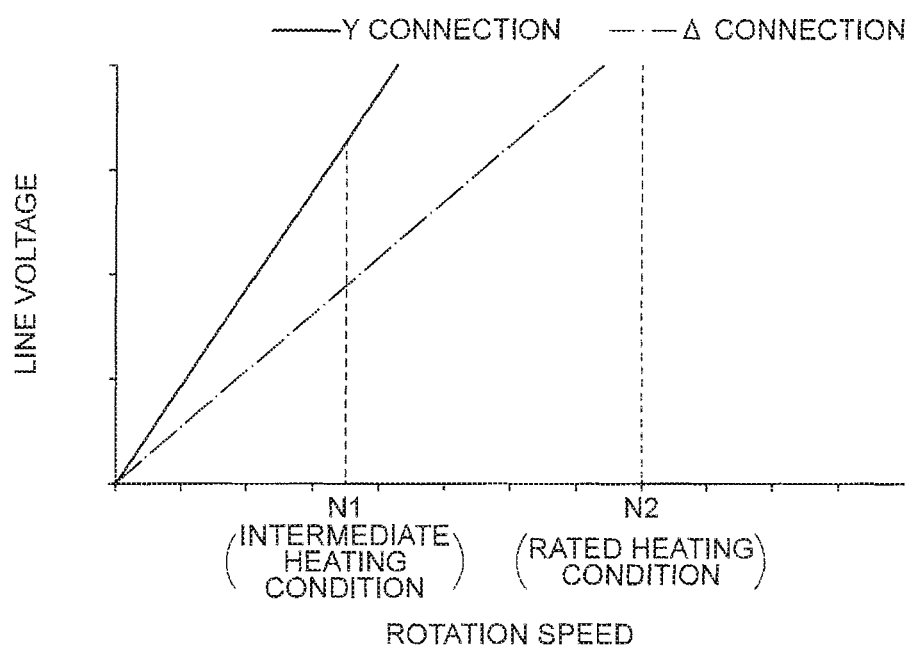
FIG. 11 is a graph showing a relationship between a line voltage and a rotation speed in a case where the connection state of the coils is a Y connection and a case where the connection state of the coils is a delta connection.

FIG. 11 is a graph showing a relationship between a line voltage and a rotation speed for each of the Y connection and the delta connection. A phase impedance of the coils 3 in a case where the connection state of the coils 3 is the delta connection is $1/\sqrt{3}$ times as high as that in a case where the connection state of the coils 3 is the Y connection, assuming that the number of turns of the coils 3 is the same in both cases. Thus, a line voltage (dashed line) in the case where the connection state of the coils 3 is the delta connection is $1/\sqrt{3}$ times as high as a line voltage (solid line) in the case where the connection state of the coils 3 is the Y connection, assuming that the rotation speed is the same in both cases.

That is, in the case where the coils 3 are connected in the delta connection and the number of turns is $\sqrt{3}$ times as large as that in the case of the Y connection, the line voltage is equivalent to that in the case of the Y connection for the same rotation speed N, and thus an output current of the inverter 103 is also equivalent to that in the case of the Y connection.

In a 3-phase AC synchronized state, the inverter output current in the delta connection is made equivalent (i.e., a state where a magnetic flux distribution of the motor 1 is the same and a generated torque is also the same) to the inverter output current in the Y connection, by multiplying the inverter output current in the Y connection by $\sqrt{3}$ and delaying the phase by $\pi/6$.

For example, in the Y connection illustrated in FIG. 9(A), U-phase, V-phase, and W-phase inverter output currents are represented by Iu, Iv, and Iw, and a current value of a current flowing in the U-phase coil 3U is represented by Io. In this case, the inverter output currents Iu, Iv, and Iw of the respective phases can be expressed as follows:

$Iu=Io \times \sin(\omega t)$;

$Iv=Io \times \sin(\omega t-2\pi/3)$; and $Iw=Io \times \sin(\omega t-4\pi/3)$ where ω is an angular frequency and t is time.

On the other hand, in the delta connection illustrated in FIG. 9(B), U-phase, V-phase, and W-phase inverter output currents are represented by Iu', Iv', and Iw'. In this case, using Io described above, Iu', Iv', and Iw' of the respective phases can be expressed as follows:

$Iu'=\sqrt{3} \times Io \times \sin(\omega t)$;

$Iv'=\sqrt{3} \times Io \times \sin(\omega t-2\pi/3)$; and $Iw'=\sqrt{3} \times Io \times \sin(\omega t-4\pi/3)$.

That is, the inverter output current in the delta connection is $\sqrt{3}$ times as large as the inverter output current in the Y connection, and thus an overcurrent threshold (overcurrent protection level) in the delta connection only needs to be set to a value $\sqrt{3}$ times as high as an overcurrent threshold in the Y connection.

However, during operation of the motor 1, a special operation state in which one of the U-phase, V-phase, and W-phase inverter output currents does not flow may occur. An example of such special operation state is a case where a power failure occurs at the time when any one phase of the inverter output current becomes zero. In such a special operation state, a current flows in the coils in a different manner from that in a normal operation state, and thus demagnetization occurs in a different situation.

FIG. 12(A) is a schematic diagram illustrating a state where the connection state of the coils 3 is the Y connection and one phase of the inverter output current is open. In this example, the W-phase inverter output current Iw does not flow. The number of poles of the motor 1 is six, the number of slots is nine, and the coils 3 are wound in concentrated winding.

In FIG. 12(A), when a current value of a current flowing in the U-phase coil 3U is represented by Io, a current value of a current flowing in the V-phase coil 3V is also Io. A direction of the current (more specifically, a direction of the current with respect to the winding direction) flowing in the coil 3U and a direction of the current flowing in the coil 3V are opposite to each other. In this state, magnetomotive forces occur in the coils 3U and 3V in opposite directions, and thus a flow of magnetic fluxes short-circuiting between the adjacent teeth occurs.

FIG. 12(B) is a schematic diagram illustrating a positional relationship between the stator 10 and the rotor 20 with which demagnetization of the permanent magnets 25 is most likely to occur, in a state where the W-phase inverter output current does not flow as illustrated in FIG. 12(A). As illustrated in FIG. 12(B), in a case where the inter-pole (denoted by numeral 201) of the rotor 20 faces a portion between the tooth 12 around which the coil 3U is wound and the tooth 12 around which the coil 3V is wound, demagnetization of the permanent magnets 25 is most likely to occur.

That is, the current in the coil 3U generates a magnetomotive force M1 directed inward in the radial direction in the tooth 12 around which the coil 3U is wound, and also generates a magnetomotive force M2 directed outward in the radial direction in the tooth 12 around which the coil 3V is wound. Thus, a flow F1 of magnetic fluxes intersecting the permanent magnets 25 is generated from the tip of the tooth 12 around which the coil 3U is wound toward the tip of the tooth 12 around which the coil 3V is wound.

In this state, in a case where a magnetization direction (arrow N1) of the permanent magnet 25 facing the tooth 12 around which the coil 3U is wound is an outward direction in the radial direction and a magnetization direction (arrow N2) of the permanent magnet 25 facing the tooth 12 around which the coil 3V is wound is an inward direction in the radial direction, magnetic fluxes flow in the permanent magnets 25 in a direction opposite to the magnetization direction. Thus, demagnetization of the permanent magnets 25 may occur.

Accordingly, in the case of the Y connection, it is necessary to determine an overcurrent threshold so that demagnetization of the permanent magnets 25 does not occur when the stator 10 and the rotor 20 are in the positional relationship illustrated in FIG. 12(B).

Figure 13B:
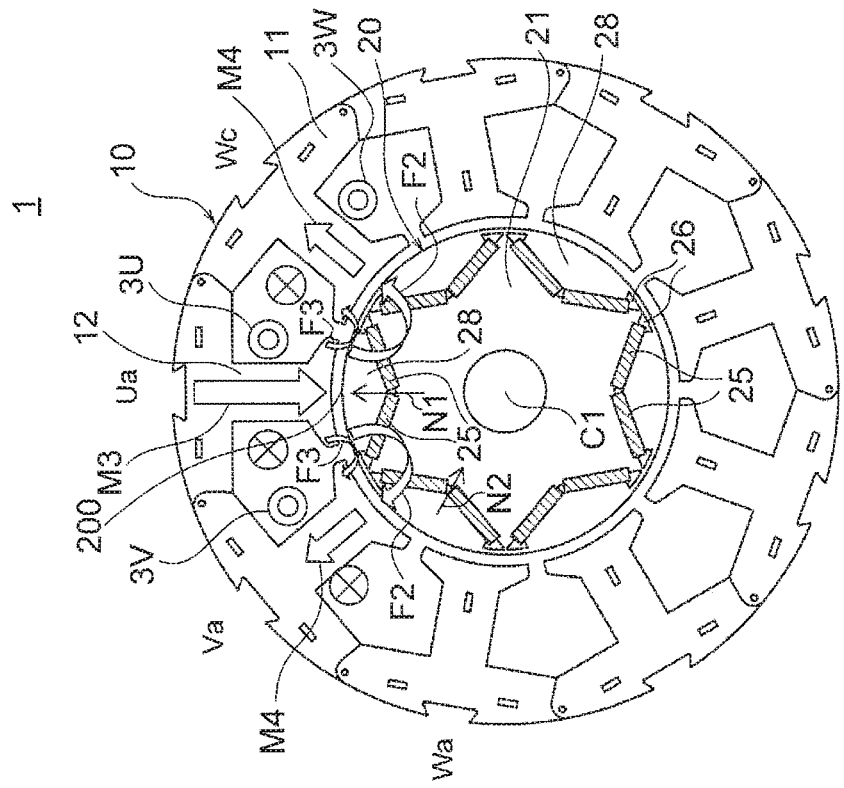
FIG. 13(B) is a schematic diagram illustrating a magnetic field acting on the permanent magnets in this operation state.
Figure 13A:
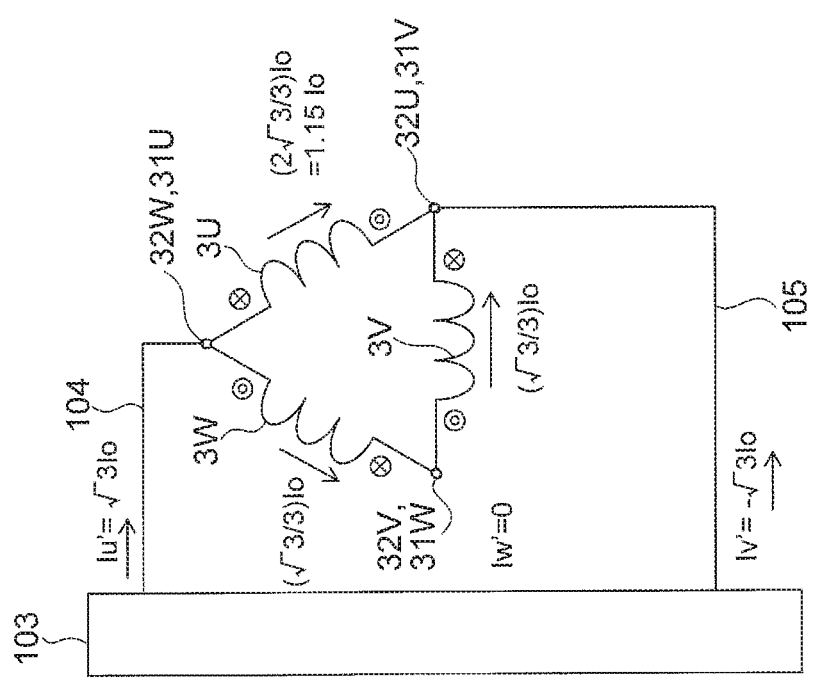
FIG. 13(A) is a schematic diagram illustrating an operation state in which a current flows only in coils of two phases in the delta connection.

FIG. 13(A) is a schematic diagram illustrating a state where the connection state of the coils 3 is the delta connection and one phase of the inverter output current is open. In this example, the W-phase inverter output current Iw does not flow.

In FIG. 13(A), a current value of a current flowing in the U-phase coil 3U is $(2\times\sqrt{3}/3)\times Io$ ($=1.15\times Io$). A current value of a current flowing in the V-phase coil 3V and a current value of a current flowing in the W-phase coil 3W are both $(\sqrt{3}/3)\times Io$ ($=0.58\times Io$). In this case, a flow of branched magnetic fluxes from the U-phase coil 3U toward the adjacent V-phase and W-phase coils 3V and 3W is generated.

FIG. 13(B) is a schematic diagram illustrating a positional relationship between the stator 10 and the rotor 20 with which demagnetization of the permanent magnets 25 is most likely to occur, in a state where the W-phase inverter output current does not flow as illustrated in FIG. 13(A). As illustrated in FIG. 13(B), in a case where the magnetic pole (denoted by numeral 200) of the rotor 20 faces the tooth 12 around which the coil 3U is wound, demagnetization of the permanent magnets 25 is most likely to occur.

That is, the current in the coil 3U generates a magnetomotive force M3 directed inward in the radial direction in the tooth 12 around which the coil 3U is wound. In addition, currents in the coils 3V and 3W generate magnetomotive forces M4 directed outward in the radial direction in the teeth 12 around the coils 3V and 3W are respectively wound. Thus, a flow F2 of magnetic fluxes F2 intersecting the permanent magnets 25 is generated from the tip of the tooth 12 around which the coil 3U is wound toward the tips of the teeth 12 around which the coils 3V and 3W are respectively wound.

In this state, in a case where a magnetization direction (arrow N1) of the permanent magnets 25 facing the tooth 12 around which the coil 3U is wound is an outward direction in the radial direction, magnetic fluxes flow in the permanent magnets 25 in a direction opposite to the magnetization direction. Thus, demagnetization of the permanent magnets 25 may occur.

Accordingly, in the case of the delta connection, it is necessary to determine an overcurrent threshold so that demagnetization of the permanent magnets 25 does not occur when the stator 10 and the rotor 20 are in the positional relationship illustrated in FIG. 13(B).

As described above, in the case where the connection state of the coils 3 is the delta connection, a current of $1.15\times Io$ flows in the coil 3U. Thus, the magnetomotive force M3 generated by the current in the coil 3U is 1.15 times as large as, that is, increases by 15% as compared to, the magnetomotive force M1 in the case of the Y connection (FIG. 12(B)).

When the rotor 20 and the stator 10 are in the positional relationship illustrated in FIG. 13(B) (i.e., positional relationship with which demagnetization is most likely to occur), a part of the rotor core 21 (referred to as a rotor core peripheral portion 28) is present on an outer side in the radial direction of the permanent magnets 25 facing the tooth 12 around which the coil 3U is wound.

Accordingly, a part of magnetic fluxes from the tip of the tooth 12 around which the coil 3U is wound toward the tip of the tooth 12 around which the coil 3V is wound does not pass through the permanent magnets 25 but passes through the rotor core peripheral portion 28 as indicated by an arrow F3. Similarly, a part of magnetic fluxes from the tip of the tooth 12 around which the coil 3U is wound toward the tip of the tooth 12 around which the coil 3W is wound does not pass through the permanent magnets 25 but passes through the rotor core peripheral portion 28 as indicated by another arrow F3.

That is, 0 to 10% of magnetic fluxes generated by the magnetomotive force M3 caused by the current in the coil 3U result in leakage fluxes that do not pass through the permanent magnets 25. Thus, demagnetization is 5 to 15% more likely to occur in the case of the delta connection than in the case of the Y connection. The increasing amount of 5 to 15% is obtained by subtracting 0 to 10% corresponding to the leakage fluxes from 15% corresponding to the increasing amount of the magnetomotive force.

In other words, in order to suppress demagnetization of the permanent magnets 25 in the Y connection and in the delta connection, an overcurrent threshold in the case of the delta connection needs to be set to a value lower by 5 to 15% than a value $\sqrt{3}$ times as high as an overcurrent threshold in the case of the Y connection.

For example, in a permanent magnet-embedded motor, a criterion for a demagnetization rate of the permanent magnets is −3%. Thus, an overcurrent threshold (overcurrent protection level) is set so that the demagnetization rate does not fall below −3%. The overcurrent threshold in the case of the Y connection is represented by A. If an overcurrent threshold B in the case of the delta connection is set to ($\sqrt{3}\times A$), demagnetization may occur when any phase of the inverter output current is open.

Accordingly, in the first embodiment, the overcurrent threshold B in the case of the delta connection is set to a value lower than ($\sqrt{3}\times A$) (i.e., $B<\sqrt{3}\times A$). The overcurrent threshold A is also referred to as a first threshold A (or a first overcurrent threshold A). The overcurrent threshold B is also referred to as a second threshold B (or a second overcurrent threshold B).

From the viewpoint of suppressing demagnetization of the permanent magnets 25, the overcurrent threshold B is preferably lower than ($\sqrt{3}\times A$) and is preferably as low as possible, but if the overcurrent threshold B is excessively low, a maximum driving output of the motor 1 is restricted. Thus, it is preferable to set the overcurrent threshold B to a value as high as possible while suppressing demagnetization of the permanent magnets 25.

As described above, the magnetomotive force generated by the current in the U-phase coil 3U in the delta connection is larger than that in the Y connection by 15% at maximum. Thus, the overcurrent threshold B in the delta connection is preferably higher than ($\sqrt{3}\times A\times 0.85$) and lower than ($\sqrt{3}\times A$). In other words, it is preferable that ($\sqrt{3}\times A\times 0.85$)<B<($\sqrt{3}\times A$) is satisfied.

In addition, when the stator 10 and the rotor 20 are in the positional relationship with which demagnetization is most likely to occur in the delta connection (FIG. 13(B)), 0 to 10% of magnetic fluxes generated by the magnetomotive force M3 caused by the current flowing in the coils 3 are leakage fluxes passing through the rotor core peripheral portion 28. Thus, the overcurrent threshold B in the delta connection is preferably higher than the overcurrent threshold A in the Y connection by 5 to 15%, which is obtained by subtracting 0 to 10% corresponding to the leakage fluxes from 15% corresponding to the increasing amount of the magnetomotive force. In other words, it is preferable that $(\sqrt{3} \times A \times 0.85) < B < (\sqrt{3} \times A \times 0.95)$ is satisfied.

Figure 14:
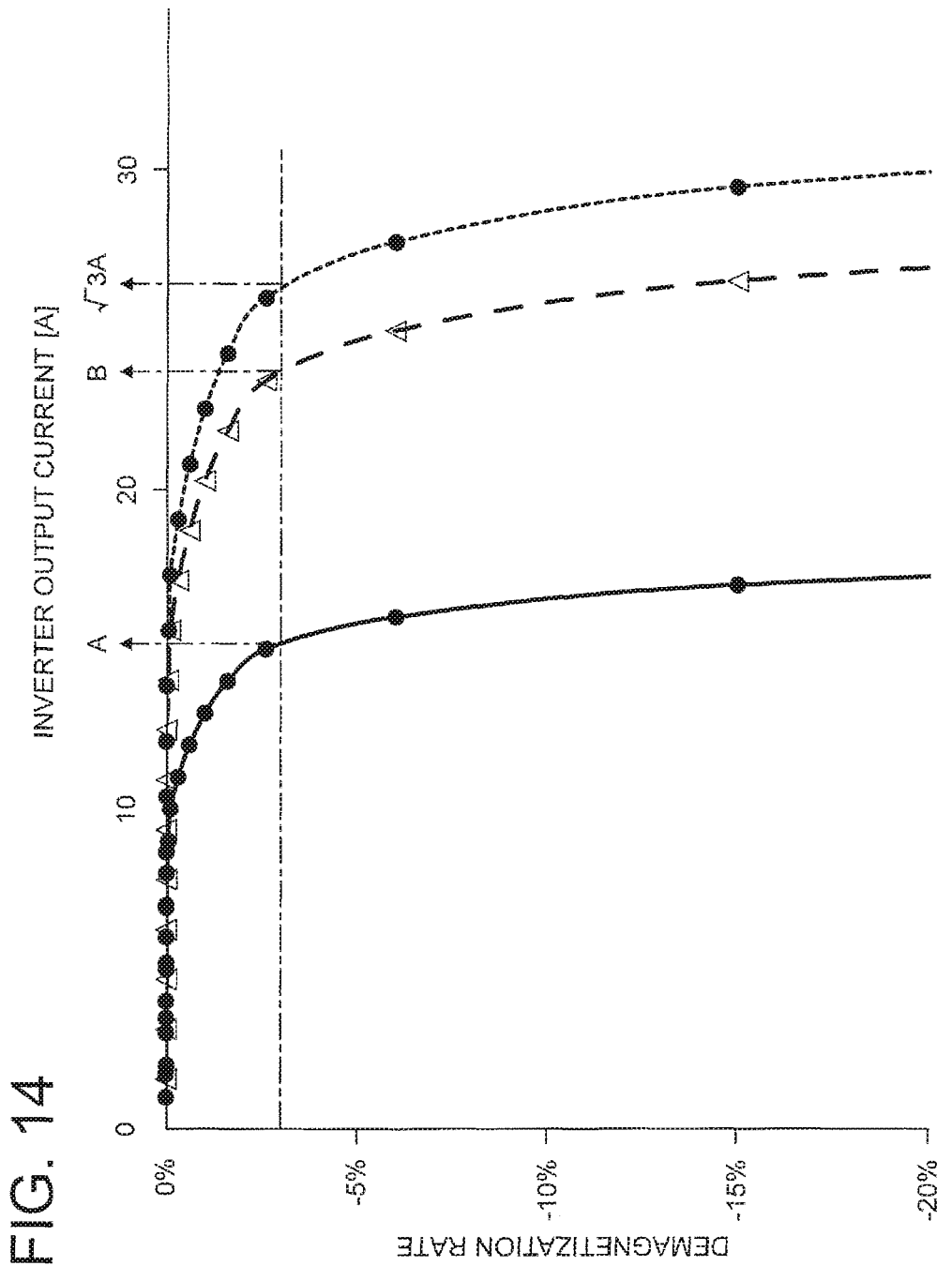
FIG. 14 is a graph showing an enhancing effect of a demagnetization rate in the first embodiment.

FIG. 14 is a graph showing a demagnetization characteristic of the motor 1 according to the first embodiment. The "demagnetization characteristic" refers to a change in demagnetization rate with respect to a current value. The horizontal axis represents an output current (A) of the inverter 103, and the vertical axis represents a demagnetization rate (%). The demagnetization rate (%) is obtained by {(induced voltage after current application/induced voltage before current application)−1}×100. The induced voltage corresponds to the amount of magnetic fluxes interlinked with the coils 3. In this embodiment, the demagnetization rate of the permanent magnets 25 is measured while changing the output current of the inverter 103 from 0A to 30A.

In FIG. 14, the solid line represents a demagnetization characteristic in the Y connection, and the broken line represents a demagnetization characteristic in the delta connection. The dotted line is formed by connecting points each obtained by multiplying a current value in the demagnetization characteristic in the Y connection by $\sqrt{3}$.

The overcurrent threshold A is a current value when the demagnetization rate is −3% in the Y connection. The overcurrent threshold B is a current value when the demagnetization rate is −3% in the delta connection. The overcurrent threshold B is a current value lower by 5 to 15% than the value obtained by multiplying the overcurrent threshold A by $\sqrt{3}$ (i.e., $\sqrt{3}A$).

That is, if the overcurrent threshold B is set to a value equal to a value obtained by multiplying the overcurrent threshold A by $\sqrt{3}$ (i.e., $\sqrt{3}A$), demagnetization may occur in a state where one phase of the inverter output current does not flow, for example. By setting the overcurrent threshold B to a value lower than $\sqrt{3}A$ by 5 to 15%, the effect of suppressing demagnetization can be enhanced.

As described above, the switching is performed between the Y connection and the delta connection, and the overcurrent thresholds A and B are set in accordance with the connection state. The overcurrent threshold B is preferably set to satisfy $B < (\sqrt{3} \times A)$, more preferably set to satisfy $(\sqrt{3} \times A \times 0.85) < B < (\sqrt{3} \times A)$, and much more preferably set to satisfy $(\sqrt{3} \times A \times 0.85) < B < (\sqrt{3} \times A \times 0.95)$. Accordingly, a driving efficiency of the motor 1 can be increased, and demagnetization of the permanent magnets can be reduced, so that reliability of the motor 1 can be enhanced.

In the rotary compressor 8 or the like, the motor 1 is used in an atmosphere of 100° C. or higher, but a rare earth magnet constituting the permanent magnet 25 has a characteristic of being demagnetized easily at a high temperature. Thus, in order to suppress demagnetization, a rare earth magnet generally needs to be added with dysprosium (Dy), which is an expensive rare earth element.

In the first embodiment, demagnetization of the permanent magnet 25 can be suppressed. Thus, in the motor 1 used for the rotary compressor 8 or the like, the permanent magnet 25 can be constituted by a rare earth magnet containing no dysprosium. As a result, manufacturing cost of the motor 1 can be reduced.

(Operation of Air Conditioner)

Figure 15:
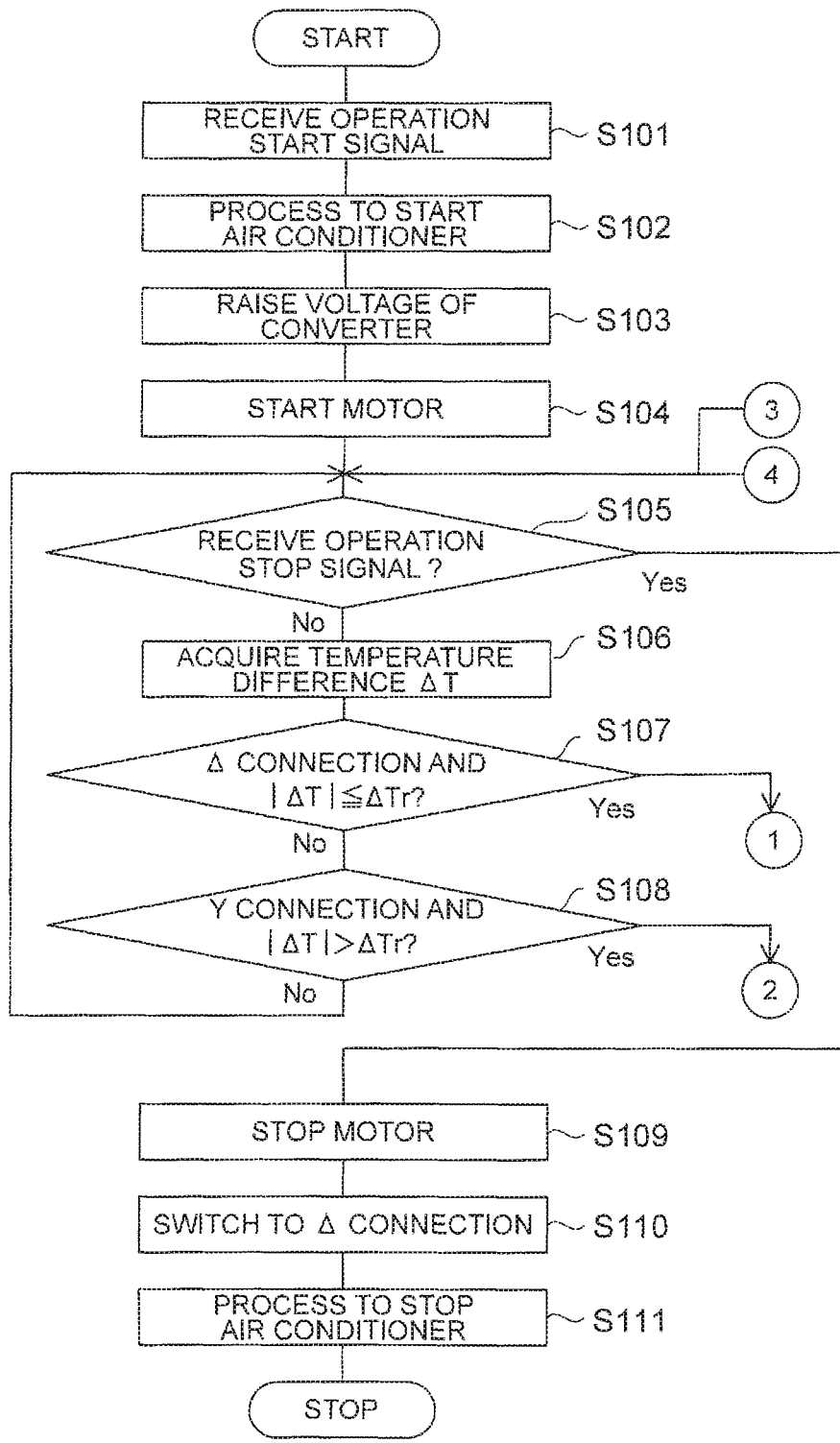
FIG. 15 is a flowchart illustrating a basic operation of the air conditioner according to the first embodiment.

FIG. 15 is a flowchart illustrating a basic operation of the air conditioner 5. The controller 50 of the air conditioner 5 starts an operation when the signal reception unit 56 receives a start signal from the remote controller 55 (step S101). In this example, the CPU 57 of the controller 50 is activated. As will be described later, since the connection state of the coils 3 is switched to the delta connection when the preceding operation of the air conditioner 5 is terminated, the connection state of the coils 3 is the delta connection when the operation is started (at start-up).

Next, the controller 50 performs a start process of the air conditioner 5 (step S102). Specifically, fan motors of the indoor fan 47 and the outdoor fan 46 are driven, for example.

Then, the controller 50 outputs a voltage switching signal to the converter 102 to raise a bus voltage of the converter 102 to a second bus voltage (for example, 390 V) corresponding to the delta connection (step S103). The bus voltage of the converter 102 is the maximum voltage applied from the inverter 103 to the motor 1.

Then, the controller 50 starts the motor 1 (step S104) Accordingly, the motor 1 is started in a state where the connection state of the coils 3 is the delta connection. The controller 50 controls the output voltage of the inverter 103 to control the rotation speed of the motor 1. More specifically, the CPU 110 illustrated in FIG. 6 controls an output voltage of the inverter 103 through the inverter driving circuit 111.

The controller 50 increases the rotation speed of the motor 1 stepwise at a preset speed in accordance with the temperature difference ΔT between the indoor temperature Ta detected by the indoor temperature sensor 54 and the set temperature Ts. An allowable maximum rotation speed of the rotation speed of the motor 1 is, for example, 130 rps. As a result, the amount of refrigerant circulated by the compressor 41 is increased. Thus, a cooling capacity is increased in the case of the cooling operation, and a heating capacity is increased in the case of the heating operation.

Furthermore, when the indoor temperature Ta approaches the set temperature Ts due to an air conditioning effect so that the temperature difference ΔT shows a decreasing tendency, the controller 50 reduces the rotation speed of the motor 1 in accordance with the temperature difference ΔT. When the temperature difference ΔT decreases to a predetermined temperature near zero (but larger than zero), the controller 50 operates the motor 1 at an allowable minimum rotation speed (for example, 20 rps).

When the temperature Ta reaches the set temperature Ts (for example, when the temperature difference ΔT reaches zero or smaller), the controller 50 stops rotation of the motor 1 in order to prevent overcooling (or overheating). Accordingly, the compressor 41 is stopped. Then, when the temperature difference ΔT becomes larger than zero again, the controller 50 restarts rotation of the motor 1. The controller 50 restricts restart of rotation of the motor 1 in a short time period so as not to repeat rotation and stop of the motor 1 in a short time period.

When the rotation speed of the motor 1 reaches a preset rotation speed, the inverter 103 starts field-weakening control.

The controller 50 determines whether or not an operation stop signal (a signal to stop operation of the air conditioner 5) is received from the remote controller 55 through the signal receiver 56 (step S105). If the operation stop signal is not received, the controller 50 proceeds to step S106. If the operation stop signal is received, the controller 50 proceeds to step S109.

The controller 50 acquires the temperature difference ΔT between the indoor temperature Ta detected by the indoor temperature sensor 54 and the set temperature Ts set by the remote controller 55 (step S106). Based on the temperature difference ΔT, the controller 50 determines whether or not to switch the connection state of the coils 3 from the delta connection to the Y connection. That is, the controller 50 determines whether or not the connection state of the coils 3 is the delta connection and an absolute value of the temperature difference ΔT is equal to or smaller than a threshold ΔTr (step S107). The threshold ΔTr (set temperature difference) is a temperature difference corresponding to an air-conditioning load (also referred to simply as "load") that is small enough to perform switching to the Y connection.

As described above, ΔT is represented as ΔT=Ts−Ta when the operation mode is the heating operation and is represented as ΔT=Ta−Ts when the operation mode is the cooling operation. Thus, in this example, the absolute value of ΔT and the threshold ΔTr are compared to determine whether it is necessary to switch to the Y connection or not.

Figure 16:
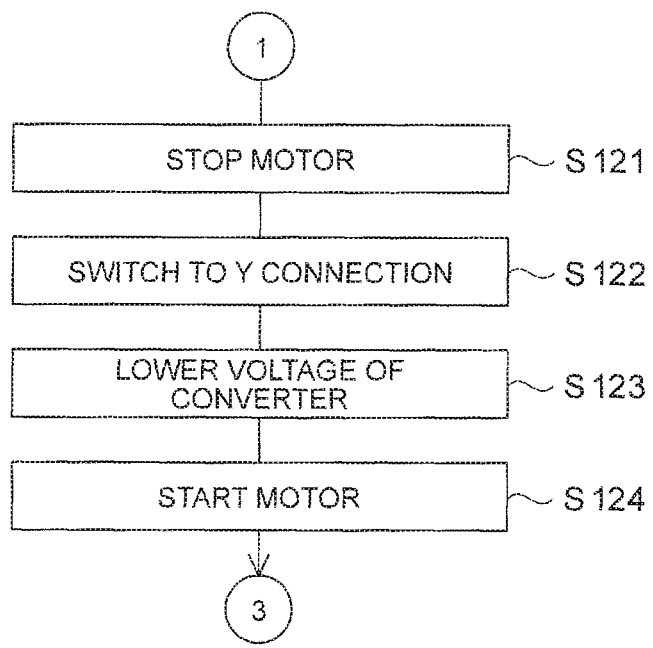
FIG. 16 is a flowchart illustrating a switching operation from the delta connection to the Y connection in the first embodiment.

In step S107, if the connection state of the coils 3 is the delta connection and the absolute value of the temperature difference ΔT is smaller than or equal to the threshold ΔTr, the process proceeds to step S121 (FIG. 16).

As shown in FIG. 16, in step S121, the controller 50 outputs a stop signal to the inverter 103 to stop rotation of the motor 1 (i.e., cause the inverter 130 to stop outputting). Thereafter, the controller 50 outputs the connection switching signal to the connection switching unit 60 to switch the connection state of the coils 3 from the delta connection to the Y connection (step S122). Subsequently, the controller 50 outputs a voltage switching signal to the converter 102 to lower the bus voltage of the converter 102 to a first voltage (280 V) corresponding to the Y connection (step S123), and restarts rotation of the motor 1 (step S124). Thereafter, the process returns to step S105 described above (FIG. 15).

In step S107, if the connection state of the coils 3 is not the delta connection, or if the absolute value of the temperature difference ΔT is larger than the threshold ΔTr (i.e., if it is unnecessary to switch to the Y connection), the process proceeds to step S108.

In step S108, the controller 50 determines whether or not to switch from the Y connection to the delta connection. That is, the controller 50 determines whether or not the connection state of the coils 3 is the Y connection and the absolute value of the temperature difference ΔT described above is larger than the threshold ΔTr.

Figure 17:
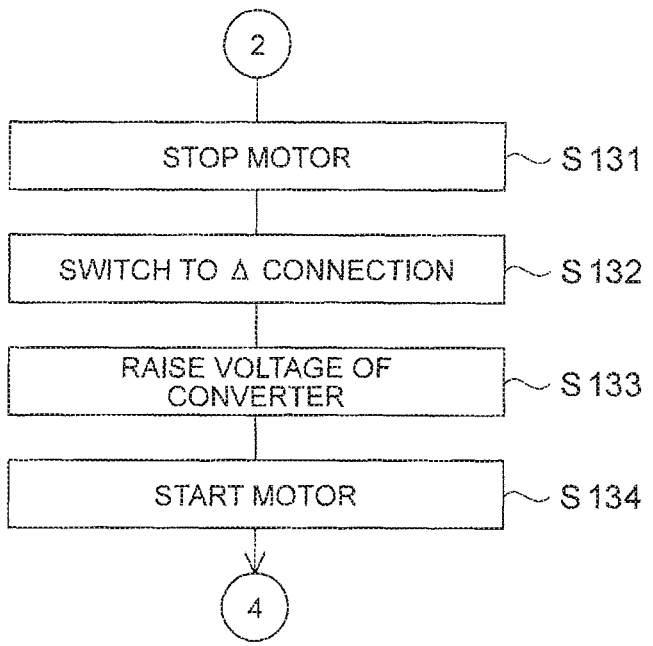
FIG. 17 is a flowchart illustrating a switching operation from the Y connection to the delta connection in the first embodiment.

As a result of the comparison in step S108, if the connection state of the coils 3 is the Y connection and the absolute value of the temperature difference ΔT is larger than the threshold ΔTr, the process proceeds to step S131 (FIG. 17).

As shown in FIG. 17, in step S131, the controller 50 stops rotation of the motor 1. Thereafter, the controller 50 outputs the connection switching signal to the connection switching unit 60 to switch the connection state of the coils 3 from the Y connection to the delta connection (step S132). Subsequently, the controller 50 outputs the voltage switching signal to the converter 102 to raise the bus voltage of the converter 102 to a second voltage (390 V) corresponding to the delta connection (step S133), and restarts rotation of the motor 1 (step S134).

In the case of the delta connection, the motor 1 can be driven to a higher rotation speed as compared to the case of the Y connection, and thus it is possible to cope with a larger load. It is therefore possible to converge the temperature difference ΔT between the indoor temperature and the set temperature in a short time period. Thereafter, the process returns to step S105 described above (FIG. 15).

If the connection state of the coils 3 is the delta connection and the absolute value of the temperature difference ΔT is larger than the threshold ΔTr, or if the connection state of the coils 3 is the Y connection and the absolute value of the temperature difference ΔT is smaller than or equal to the threshold ΔTr, the results of determinations in steps S107 and S108 are both NO, and thus the process returns to step S105.

If the operation stop signal is received in step S105 described above, rotation of the motor 1 is stopped (step S109). Thereafter, the controller 50 switches the connection state of the coils 3 from the Y connection to the delta connection (step S110). If the connection state of the coils 3 is already the delta connection, the connection state is maintained. Although not shown in FIG. 15, if the operation stop signal is received in steps S106 through S108, the process proceeds to step S109 and rotation of the motor 1 is stopped.

Thereafter, the controller 50 performs a stop process of the air conditioner 5 (step S111). Specifically, the fan motors of the indoor fan 47 and the outdoor fan 46 are stopped. Thereafter, the CPU 57 of the controller 50 is stopped, and operation of the air conditioner 5 is terminated.

As described above, if the absolute value of the temperature difference ΔT between the indoor temperature Ta and the set temperature Ts is smaller than or equal to the threshold ΔTr, the motor 1 is operated in the Y connection that achieves high efficiency. If the absolute value of the temperature difference ΔT is larger than the threshold ΔTr, the motor 1 is operated in the delta connection that enables coping with a larger load. Accordingly, the operation efficiency of the air conditioner 5 can be enhanced.

In particular, fluctuation in temperature is small in a short time period, and thus whether or not to perform the connection switching can be determined in a short time period. Accordingly, it is possible to promptly cope with a rapid load change as in the case where a window of the room is opened, for example. Thus, comfort provided by the air conditioner 5 can be enhanced.

In the first embodiment, when the connection state of the coils 3 is the Y connection, the bus voltage of the converter 102 is set to 280V (step S123). When the connection state of the coils 3 is the delta connection, the bus voltage of the converter 102 is set to 390 V (step S133). In other words, the bus voltage in a high rotational speed range of the motor 1 is higher than the bus voltage in a low rotational speed range. Accordingly, a high motor efficiency can be obtained.

In addition, in the first embodiment, the connection state of the coils 3 at the start of the motor 1 is the delta connection that enables coping with a larger air-conditioning load (step S110 in FIG. 15). Since it is difficult to accurately detect the air-conditioning load at the start of operation of the air conditioner 5, the temperature difference ΔT between the indoor temperature Ta and the set temperature Ts can be converged in a shorter time period by setting the connection state at the start to the delta connection.

In steps S106 through S108 in FIG. 15, the connection switching is performed based on the temperature difference ΔT between the indoor temperature Ta and the set temperature Ts, but the connection switching may be performed by another method. For example, it is also possible to detect the rotation speed of the motor 1, to perform switching from the delta connection to the Y connection if the rotation speed of the motor 1 is lower than or equal to a set rotation speed (threshold), and to perform switching from the Y connection to the delta connection if the rotation speed of the motor 1 is higher than the set rotation speed.

The rotation speed of the motor 1 may be detected based on, for example, a current value detected by the current detection circuit 108. The set rotation speed (threshold) is preferably 60 rps as an intermediate value between 35 rps corresponding to an intermediate heating condition (intermediate cooling condition) and 85 rps corresponding to a rated heating condition (rated cooling condition).

<Overcurrent Protection Operation>

Figure 18:
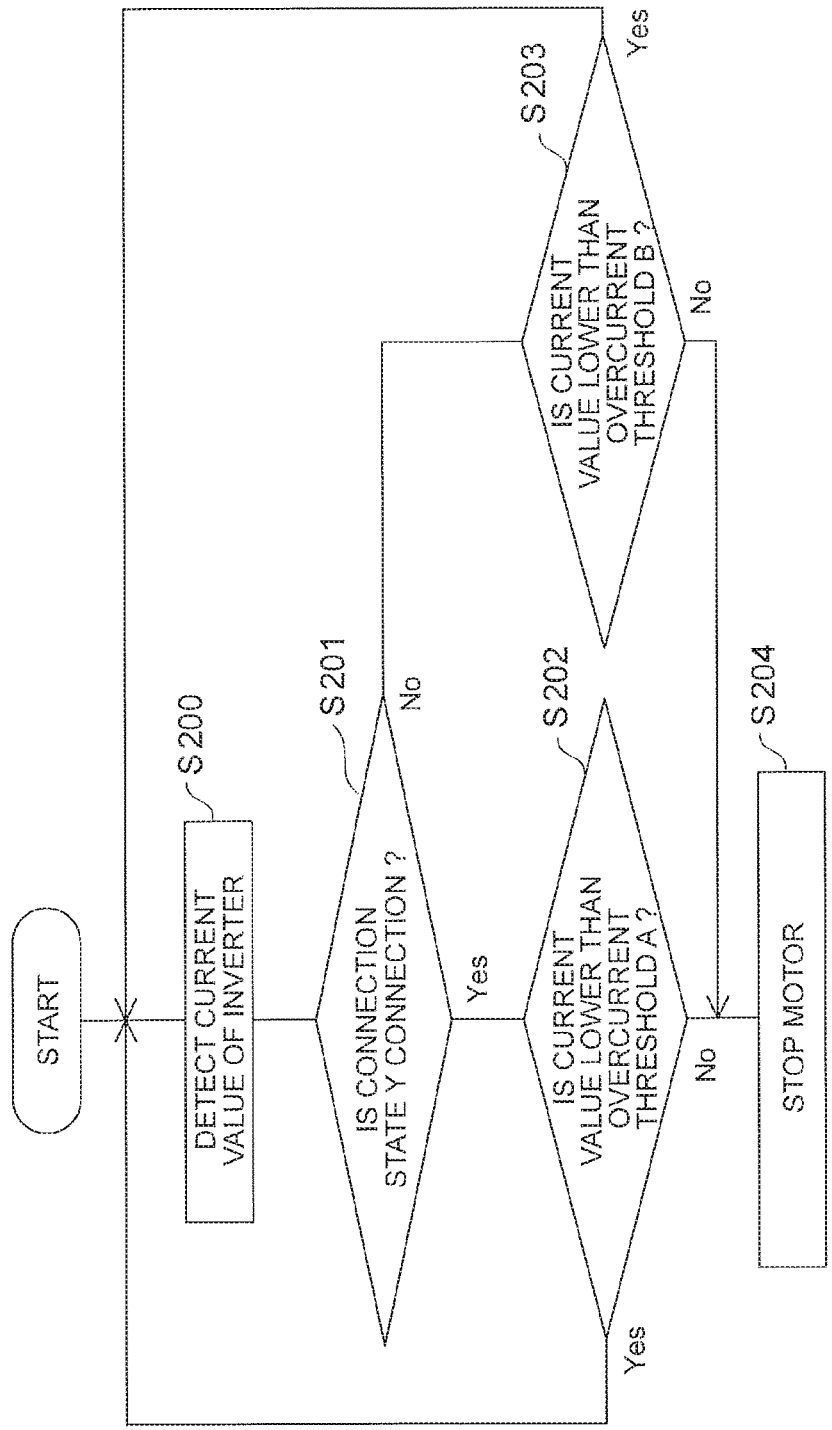
FIG. 18 is a flowchart illustrating an overcurrent protection operation in the first embodiment.

FIG. 18 is a flowchart illustrating an overcurrent protection operation of the first embodiment. The overcurrent protection operation is performed during rotation of the motor 1, that is, during steps S104 through S108 shown in FIG. 15.

First, the CPU 110 of the controller 50 (FIG. 6) detects a current value of the inverter 103 using the current detection circuit 108 (step S200). Then, the CPU 110 determines whether the connection state of the coils 3 is the Y connection or the delta connection (step S201).

If the connection state of the coils 3 is the Y connection, the controller 50 determines whether the current value detected by the current detection circuit 108 is lower than the overcurrent threshold A or not (step S202). If the current value is lower than the overcurrent threshold A, the process returns to step S200. On the other hand, if the current value is higher than or equal to the overcurrent threshold A, the controller 50 outputs a stop signal to the inverter 103, and causes the inverter 103 to stop outputting. In other words, rotation of the motor 1 is stopped (step S204).

In step S201 described above, if the connection state of the coils 3 is the delta connection, the controller 50 determines whether the current value detected by the current detection circuit 108 is lower than the overcurrent threshold B or not (step S203). If the current value is lower than the overcurrent threshold B, the process returns to step S200. On the other hand, if the current value is higher than or equal to the overcurrent threshold B, the controller 50 outputs the stop signal to the inverter 103 and causes the inverter 103 to stop outputting. In other words, rotation of the motor 1 is stopped (step S204).

The overcurrent thresholds A and B satisfy $B<\sqrt{3}\times A$, preferably satisfy $\sqrt{3}\times A\times 0.85<B<\sqrt{3}\times A$, and more preferably satisfy $\sqrt{3}\times A\times 0.85<B<\sqrt{3}\times A\times 0.95$. Thus, even when a magnetomotive force increases in an operation state where a current does not flow in one phase of the coils 3 in the delta connection, demagnetization of the permanent magnets 25 can be suppressed.

If the overcurrent threshold B in the case of the delta connection is set to be lower than ($\sqrt{3}\times A$), an output is lower than that in the case where the overcurrent threshold B is set to ($\sqrt{3}\times A$). In a compressor, an automobile or the like, the range of the rotation speed of the motor 1 is wide, and field-weakening control is started in a high rotational speed range (for example, a state where the output of the inverter 103 reaches an inverter maximum output voltage in the Y connection). In the field-weakening control, the inverter output current increases by a weakening current, and thus the current value is more likely to reach the overcurrent threshold B.

In the first embodiment, since the switching from the Y connection to the delta connection is performed as described above, the field-weakening control is less likely to be started in the high rotational speed range. Thus, even if the overcurrent threshold B in the case of the delta connection is set to be lower than ($\sqrt{3}\times A$), a torque larger than or equal to that in the case of the Y connection can be generated, and a high output can be obtained.

Advantages of First Embodiment

As described above, in the driving device 100 according to the first embodiment of the present invention, if the connection state of the coils 3 is the Y connection and the current value of the inverter 103 reaches the first threshold A (i.e., the overcurrent threshold A), or if the connection state of the coils 3 is the delta connection and the current value of the inverter 103 reaches the second threshold B (i.e., the overcurrent threshold B), an output of the inverter is stopped. The first threshold A and the second threshold B satisfy $B<\sqrt{3}\times A$. Thus, demagnetization of the permanent magnets 25 can be reduced (made less likely to occur) even in an operation state where no current flows in one phase of the coils 3, for example.

Since the overcurrent thresholds A and B satisfy $\sqrt{3}\times A\times 0.85<B<\sqrt{3}\times A$, even when a magnetomotive force increases in an operation state where no current flows in one phase of the coils 3 in the delta connection, demagnetization of the permanent magnets 25 can be suppressed.

Furthermore, since the overcurrent thresholds A and B satisfy $(\sqrt{3}\times A\times 0.85)<B<(\sqrt{3}\times A\times 0.95)$, demagnetization of the permanent magnets 25 can be suppressed in consideration of leakage fluxes in the rotor core peripheral portion 28.

The controller 50 further includes the current detection circuit 108 for detecting a current of the inverter 103, and the CPU (inverter controller) 110 for outputting a PWM signal to the inverter 103 based on the current detected by the current detection circuit 108 and the connection state of the coils 3. Thus, rotation of the motor 1 can be controlled in accordance with a current supplied to the motor 1 and the connection state of the coils 3.

The connection switching unit 60 sets the connection state of the coils 3 to the Y connection in a first rotational speed range of the motor 1 (for example, when the temperature difference ΔT between the indoor temperature Ta and the set temperature Ts is smaller than or equal to the threshold ΔTr), and sets the connection state of the coils 3 to the delta connection in a second rotational speed range higher than the first rotational speed range (for example, when the temperature difference ΔT is larger than the threshold ΔTr). Thus, the motor 1 can be rotated in the connection state in accordance with the air-conditioning load, and the motor efficiency can be enhanced in both of the Y connection and the delta connection.

Since the inverter 103 performs the field-weakening control in accordance with the rotation speed of the motor 1, the rotation speed of the motor 1 can be increased even after an output of the inverter 103 reaches the maximum output voltage.

The motor 1 has the coils 3 wound in concentrated winding, and the ratio of the number of magnetic poles to the number of slots of the rotor 20 (i.e., the number of teeth 12) is 2:3. Thus, occurrence of third harmonic wave in the induced voltage can be suppressed. Thus, degradation of performance of the motor 1 by a cyclic current can be suppressed.

Since the demagnetization of the permanent magnets 25 is likely to occur at a higher temperature, the effect of suppressing the demagnetization in the first embodiment is especially remarkable when the motor 1 is used at a temperature of 100° C. or higher.

Since the connection switching unit 60 has the switches 61, 62, and 63 constituted by relay contacts, the connection state of the coils 3 can be switched with a relatively inexpensive configuration.

Since the converter 102 changes the level of the bus voltage in accordance with the switching of the connection state of the coils 3 by the connection switching unit 60, both of a high motor efficiency and a high motor torque can be obtained before and after the switching of the connection state.

Variation

Next, a variation of the first embodiment will be described. In the first embodiment described above, the connection switching unit 60 including the relay contacts (switches 61, 62, and 63) is used. On the other hand, in the variation, a connection switching unit 70 including semiconductor switches 71, 72, and 73 is used.

FIG. 19 is a block diagram illustrating a configuration of a driving device 100A according to the variation. The driving device 100A is different from the driving device 100 illustrated in FIG. 6 in the configuration of the connection switching unit 70.

The connection switching unit 70 includes the semiconductor switches (semiconductor elements) 71, 72, and 73. Each of the semiconductor switches 71, 72, and 73 is constituted by a circuit including a metal-oxide-semiconductor (MOS) field-effect transistor.

The semiconductor switch 71 includes a first terminal 71a connected to the wire 105 (V phase), a second terminal 71b connected to the neutral point 33, and a third terminal 71c connected to the terminal 32U of the coil 3U and connected to either the first terminal 71a or the second terminal 71b.

The semiconductor switch 72 includes a first terminal 72a connected to the wire 106 (W phase), a second terminal 72b connected to the neutral point 33, and a third terminal 72c connected to the terminal 32V of the coil 3V and connected to either the first terminal 72a or the second terminal 72b.

The semiconductor switch 73 includes a first terminal 73a connected to the wire 104 (U phase), a second terminal 73b connected to the neutral point 33, and a third terminal 73c connected to the terminal 32W of the coil 3W and connected to either the first terminal 73a or the second terminal 73b.

In a case where the semiconductor switch 71 connects the terminal 32U of the coil 3U to the neutral point 33, the semiconductor switch 72 connects the terminal 32V of the coil 3V to the neutral point 33, and the semiconductor switch 73 connects the terminal 32W of the coil 3W to the neutral point 33, the connection state of the coils 3U, 3V, and 3W is the Y connection illustrated in FIG. 9(A).

In a case where the semiconductor switch 71 connects the terminal 32U of the coil 3U to the wire 105, the semiconductor switch 72 connects the terminal 32V of the coil 3V to the wire 106, and the semiconductor switch 73 connects the terminal 32W of the coil 3W to the wire 104, the connection state of the coils 3U, 3V, and 3W is the delta connection illustrated in FIG. 9(B).

As described above, the connection switching unit 70 switches the connection state of the coils 3U, 3V, and 3W of the motor 1 between the Y connection (first connection state) and the delta connection (second connection state) by switching of the semiconductor switches 71, 72, and 73.

In this variation, since the connection switching unit 70 includes the semiconductor switches 71, 72, and 73, reliability in connection switching operation can be enhanced.

When the connection switching unit 60 (FIG. 7) including the relay contacts (switches 61, 62, and 63) is used, it is preferable to stop the rotation of the motor 1 during the connection switching. However, when the connection switching unit 70 including the semiconductor switches 71, 72, and 73 is used, there is a merit that it is only necessary to reduce (decelerate) the rotation speed of the motor 1 during the connection switching.

The rotary compressor 8 has been described as an example of the compressor in the first embodiment and the variation thereof have, but the motor of the first embodiment and the variation may be applied to compressors other than the rotary compressor 8. The motor 1 is not necessarily incorporated in the compressor (the rotary compressor 8), and may be independent from the compressor. That is, it is sufficient that the motor 1 is configured to drive the compressor.

Although the preferred embodiment of the present invention has been specifically described above, the present invention is not limited to the above described embodiment, and various modifications or variations may be made without departing from the gist of the invention.

What is claimed is:

1. A driving device to drive a motor having coils, the driving device comprising:
    an inverter to output a voltage to the coils;
    a connection switching device to switch a connection state of the coils between a Y connection and a delta connection; and
    a controller to cause the inverter to stop outputting, when the connection state of the coils is the Y connection and a current value of the inverter reaches a first threshold A, or when the connection state of the coils is the delta connection and the current value of the inverter reaches a second threshold B,
    wherein the first threshold A and the second threshold B satisfy:

$$\sqrt{3} \times A \times 0.85 < B < \sqrt{3} \times A.$$

2. The driving device according to claim 1, wherein the first threshold A and the second threshold B satisfy:

$$\sqrt{3} \times A \times 0.85 < B < \sqrt{3} \times A \times 0.95.$$

3. The driving device according to claim 1, wherein the controller comprises:
    a current detector to detect the current value of the inverter; and
    an inverter controller to perform a PWM control on the inverter in accordance with the current value detected by the current detector and the connection state of the coils.

4. The driving device according to claim 3, wherein the controller comprises an inverter driving circuit to output a driving signal to the inverter in accordance with a PWM control signal outputted by the inverter controller.

5. The driving device according to claim 1, wherein the motor is operable in a first rotational speed range and a second rotational speed range higher than the first rotational speed range,
    wherein the connection switching device sets the connection state of the coils to the Y connection when the motor is in the first rotational speed range, and
    wherein the connection switching device sets the connection state of the coils to the delta connection when the motor is in the second rotational speed range.

6. The driving device according to claim 1, wherein the inverter performs field-weakening control in accordance with a rotation speed of the motor.

7. The driving device according to claim 1, wherein the motor has a rotor rotatable about a rotation axis, and a stator surrounding the rotor, and wherein the rotor has a rotor core and a permanent magnet embedded in the rotor core.

8. The driving device according to claim 7, wherein the stator has a stator core having a plurality of teeth arranged in a circumferential direction about the rotation axis, and coils wound around the plurality of teeth in concentrated winding, and wherein a ratio of a number of poles of the rotor to a number of the teeth is 2:3.

9. The driving device according to claim 1, wherein the motor is used at a temperature higher than or equal to 100° C.

10. The driving device according to claim 1, wherein the connection switching device has a relay contact.

11. The driving device according to claim 1, wherein the connection switching device has a semiconductor element.

12. A compressor comprising:

the motor driven by the driving device according to claim 1; and a compressor mechanism driven by the motor.

13. An air conditioner comprising a compressor, an outdoor heat exchanger, a decompressor, and an indoor heat exchanger, wherein the compressor is driven by the motor driven by the driving device according to claim 1.

14. A driving method to drive a motor by means of an inverter, the motor having coils whose connection state is switchable between a Y connection and a delta connection, the driving method comprising the steps of:

detecting a current value of the inverter; and causing the inverter to stop outputting when the connection state of the coils is the Y connection and the current value of the inverter reaches a first threshold A, or when the connection state of the coils is the delta connection and the current value of the inverter reaches a second threshold B, wherein the first threshold A and the second threshold B satisfy:

$\sqrt{3} \times A \times 0.85 < B < \sqrt{3} \times A.$

* * * * *